US011770335B2

(12) United States Patent
Forbes, Jr.

(10) Patent No.: US 11,770,335 B2
(45) Date of Patent: *Sep. 26, 2023

(54) SYSTEMS, METHODS, AND APPARATUS FOR COMMUNICATING MESSAGES OF DISTRIBUTED PRIVATE NETWORKS OVER MULTIPLE PUBLIC COMMUNICATION NETWORKS

(71) Applicant: Causam Enterprises, Inc., Raleigh, NC (US)

(72) Inventor: Joseph W. Forbes, Jr., Raleigh, NC (US)

(73) Assignee: CAUSAM ENTERPRISES, INC., Raleigh, NC (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/091,606

(22) Filed: Nov. 6, 2020

(65) Prior Publication Data

US 2021/0135987 A1     May 6, 2021

Related U.S. Application Data

(63) Continuation of application No. 16/170,735, filed on Oct. 25, 2018, now Pat. No. 10,833,985, which is a
(Continued)

(51) Int. Cl.
*H04L 45/00* (2022.01)
(52) U.S. Cl.
CPC ................................ *H04L 45/72* (2013.01)
(58) Field of Classification Search
None
See application file for complete search history.

(56) References Cited

U.S. PATENT DOCUMENTS 5,696,695 A   12/1997  Ehlers et al.
5,973,481 A   10/1999  Thompson et al.
(Continued)

FOREIGN PATENT DOCUMENTS

EP     2159749 A1     3/2010

OTHER PUBLICATIONS

Byers J. Risk Management and Monetizing the Commodity Storage Option. Natural Gas & Electricity [serial online]. Jul. 2005; 21 (12):1-8. Available from: Business Source Complete, Ipswich, MA.
(Continued)

*Primary Examiner* — Adnan Baig
(74) *Attorney, Agent, or Firm* — NEO IP

(57) ABSTRACT

Systems and methods for communicating messages of distributed private network (DPN) over a plurality of communication networks including an inter-network interface and a message coordinator communicatively coupled. The inter-network interface is operable to receive a packetized message from a first DPN network element over a first communication network. The message coordinator receives the packetized message from the inter-network interface, assigns at least a transport route for the packetized message; and communicates the packetized message to a second DPN network element based on the assigned transport route over a second communication network. The message coordinator is further operable to assign priority protocol and security protocol to the packetized message.

20 Claims, 8 Drawing Sheets

Related U.S. Application Data continuation of application No. 14/885,525, filed on Oct. 16, 2015, now Pat. No. 10,116,560.

(60) Provisional application No. 62/066,356, filed on Oct. 20, 2014.

(56) References Cited

U.S. PATENT DOCUMENTS

| | | | |
|---|---|---|---|
| 6,018,690 A | 1/2000 | Saito et al. | |
| 6,107,693 A | 8/2000 | Mongia et al. | |
| 6,154,859 A | 11/2000 | Norizuki et al. | |
| 6,216,956 B1 | 4/2001 | Ehlers et al. | |
| 6,366,217 B1 | 4/2002 | Cunningham et al. | |
| 6,583,521 B1 | 6/2003 | Lagod et al. | |
| 6,633,823 B2 | 10/2003 | Bartone et al. | |
| 6,636,977 B1 | 10/2003 | Chen | |
| 6,747,368 B2 | 6/2004 | Jarrett | |
| 6,826,267 B2 | 11/2004 | Daum et al. | |
| 6,891,838 B1 | 5/2005 | Petite et al. | |
| 6,961,641 B1 | 11/2005 | Forth et al. | |
| 7,141,321 B2 | 11/2006 | McArthur et al. | |
| 7,142,949 B2 | 11/2006 | Brewster et al. | |
| 7,233,843 B2 | 6/2007 | Budhraja et al. | |
| 7,289,887 B2 | 10/2007 | Rodgers | |
| 7,305,282 B2 | 12/2007 | Chen | |
| 7,565,227 B2 | 7/2009 | Richard et al. | |
| 7,715,951 B2 | 5/2010 | Forbes et al. | |
| 8,010,812 B2 | 8/2011 | Forbes et al. | |
| 8,032,233 B2 | 10/2011 | Forbes et al. | |
| 8,145,361 B2 | 3/2012 | Forbes et al. | |
| 8,260,470 B2 | 9/2012 | Forbes et al. | |
| 8,307,225 B2 | 11/2012 | Forbes et al. | |
| 8,315,717 B2 | 11/2012 | Forbes et al. | |
| 8,359,124 B2 | 1/2013 | Zhou et al. | |
| 8,364,609 B2 | 1/2013 | Ozog | |
| 8,417,569 B2 | 4/2013 | Gross | |
| 8,457,802 B1 | 6/2013 | Steven et al. | |
| 8,473,111 B1 | 6/2013 | Shankar et al. | |
| 8,571,930 B1 | 10/2013 | Galperin | |
| 8,583,520 B1 | 11/2013 | Forbes | |
| 8,588,991 B1 | 11/2013 | Forbes | |
| 9,419,891 B2 * | 8/2016 | Tan | H04L 45/42 |
| 10,298,544 B2 * | 5/2019 | Duval | H04L 12/4641 |
| 2002/0019758 A1 | 2/2002 | Scarpelli | |
| 2002/0019802 A1 | 2/2002 | Malme et al. | |
| 2002/0036430 A1 | 3/2002 | Welches et al. | |
| 2002/0161648 A1 | 10/2002 | Mason et al. | |
| 2002/0198629 A1 | 12/2002 | Ellis | |
| 2003/0149937 A1 | 8/2003 | McElfresh et al. | |
| 2003/0176952 A1 | 9/2003 | Collins | |
| 2004/0024483 A1 | 2/2004 | Holcombe | |
| 2004/0044571 A1 | 3/2004 | Bronnimann et al. | |
| 2004/0095237 A1 | 5/2004 | Chen et al. | |
| 2004/0107025 A1 | 6/2004 | Ransom et al. | |
| 2004/0117330 A1 | 6/2004 | Ehlers et al. | |
| 2004/0225514 A1 | 11/2004 | Greenshields et al. | |
| 2004/0249775 A1 | 12/2004 | Chen | |
| 2005/0021397 A1 | 1/2005 | Cui et al. | |
| 2005/0065742 A1 | 3/2005 | Rodgers | |
| 2005/0080772 A1 | 4/2005 | Bem | |
| 2005/0096857 A1 | 5/2005 | Hunter | |
| 2005/0096979 A1 | 5/2005 | Koningstein | |
| 2005/0097204 A1 | 5/2005 | Horowitz et al. | |
| 2005/0127680 A1 | 6/2005 | Lof et al. | |
| 2005/0138432 A1 | 6/2005 | Ransom et al. | |
| 2005/0240315 A1 | 10/2005 | Booth et al. | |
| 2005/0288954 A1 | 12/2005 | McCarthy et al. | |
| 2006/0020596 A1 | 1/2006 | Liu et al. | |
| 2006/0069616 A1 | 3/2006 | Bau | |
| 2006/0190354 A1 | 8/2006 | Meisel et al. | |
| 2006/0212350 A1 | 9/2006 | Ellis et al. | |
| 2006/0224615 A1 | 10/2006 | Korn et al. | |
| 2006/0276938 A1 | 12/2006 | Miller | |
| 2006/0282328 A1 | 12/2006 | Gerace et al. | |
| 2007/0038563 A1 | 2/2007 | Ryzerski | |
| 2007/0043478 A1 | 2/2007 | Ehlers et al. | |
| 2007/0100961 A1 | 5/2007 | Moore | |
| 2007/0150353 A1 | 6/2007 | Krassner et al. | |
| 2007/0156621 A1 | 7/2007 | Wright et al. | |
| 2007/0156887 A1 | 7/2007 | Wright et al. | |
| 2007/0174114 A1 | 7/2007 | Bigby et al. | |
| 2007/0192333 A1 | 8/2007 | Ali | |
| 2007/0213878 A1 | 9/2007 | Chen | |
| 2007/0214118 A1 | 9/2007 | Schoen et al. | |
| 2007/0214132 A1 | 9/2007 | Grubb et al. | |
| 2007/0260540 A1 | 11/2007 | Chau et al. | |
| 2008/0010212 A1 | 1/2008 | Moore et al. | |
| 2008/0040223 A1 | 2/2008 | Bridges et al. | |
| 2008/0040296 A1 | 2/2008 | Bridges et al. | |
| 2008/0104026 A1 | 5/2008 | Koran | |
| 2008/0109387 A1 | 5/2008 | Deaver et al. | |
| 2008/0133604 A1 | 6/2008 | Kim | |
| 2008/0154801 A1 | 6/2008 | Fein et al. | |
| 2008/0177678 A1 | 7/2008 | Di Martini et al. | |
| 2008/0195462 A1 | 8/2008 | Magdon-Ismail et al. | |
| 2008/0211481 A1 | 9/2008 | Chen | |
| 2008/0249832 A1 | 10/2008 | Richardson et al. | |
| 2008/0263025 A1 | 10/2008 | Koran | |
| 2008/0270223 A1 | 10/2008 | Collins et al. | |
| 2008/0281473 A1 | 11/2008 | Pitt | |
| 2008/0306824 A1 | 12/2008 | Parkinson | |
| 2008/0306830 A1 | 12/2008 | Lasa et al. | |
| 2008/0319893 A1 | 12/2008 | Mashinsky et al. | |
| 2009/0012996 A1 | 1/2009 | Gupta et al. | |
| 2009/0024718 A1 | 1/2009 | Anagnostopoulos et al. | |
| 2009/0040029 A1 | 2/2009 | Bridges et al. | |
| 2009/0045804 A1 | 2/2009 | Durling et al. | |
| 2009/0055031 A1 | 2/2009 | Slota et al. | |
| 2009/0062970 A1 | 3/2009 | Forbes et al. | |
| 2009/0063228 A1 | 3/2009 | Forbes, Jr. | |
| 2009/0088907 A1 | 4/2009 | Lewis et al. | |
| 2009/0112701 A1 | 4/2009 | Turpin | |
| 2009/0124241 A1 | 5/2009 | Krishnaswamy et al. | |
| 2009/0125462 A1 | 5/2009 | Krishnaswamy et al. | |
| 2009/0138362 A1 | 5/2009 | Schroedl et al. | |
| 2009/0157529 A1 | 6/2009 | Ehlers et al. | |
| 2009/0187344 A1 | 7/2009 | Brancaccio et al. | |
| 2009/0195349 A1 | 8/2009 | Frader-Thompson et al. | |
| 2009/0198384 A1 | 8/2009 | Ahn | |
| 2009/0228335 A1 | 9/2009 | Niyogi et al. | |
| 2009/0240677 A1 | 9/2009 | Parekh et al. | |
| 2009/0281673 A1 | 11/2009 | Taft | |
| 2009/0281674 A1 | 11/2009 | Taft | |
| 2009/0319415 A1 | 12/2009 | Stoilov et al. | |
| 2010/0045232 A1 | 2/2010 | Chen et al. | |
| 2010/0076835 A1 | 3/2010 | Silverman | |
| 2010/0106641 A1 | 4/2010 | Chassin et al. | |
| 2010/0138452 A1 | 6/2010 | Kin et al. | |
| 2010/0169175 A1 | 7/2010 | Koran | |
| 2010/0191862 A1 | 7/2010 | Forbes et al. | |
| 2010/0198535 A1 | 8/2010 | Brown et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0218108 A1 | 8/2010 | Crabtree et al. | |
| 2010/0274407 A1 | 10/2010 | Creed | |
| 2010/0293045 A1 | 11/2010 | Burns et al. | |
| 2010/0306033 A1 | 12/2010 | Oved et al. | |
| 2010/0332373 A1 | 12/2010 | Crabtree et al. | |
| 2011/0010016 A1 | 1/2011 | Giroti | |
| 2011/0025556 A1 | 2/2011 | Bridges et al. | |
| 2011/0029655 A1 | 2/2011 | Forbes et al. | |
| 2011/0055036 A1 | 3/2011 | Helfan | |
| 2011/0060474 A1 | 3/2011 | Schmiegel et al. | |
| 2011/0060476 A1 | 3/2011 | Iino et al. | |
| 2011/0078783 A1 * | 3/2011 | Duan | H04L 12/4641 714/49 |
| 2011/0080044 A1 | 4/2011 | Schmiegel | |
| 2011/0106729 A1 | 5/2011 | Billingsley et al. | |
| 2011/0115302 A1 | 5/2011 | Slota et al. | |
| 2011/0133655 A1 | 6/2011 | Recker et al. | |
| 2011/0145061 A1 | 6/2011 | Spurr et al. | |
| 2011/0161250 A1 | 6/2011 | Koeppel et al. | |

(56) References Cited

U.S. PATENT DOCUMENTS

| | | |
|---|---|---|
| 2011/0172837 A1 | 7/2011 | Forbes, Jr. |
| 2011/0172841 A1 | 7/2011 | Forbes, Jr. |
| 2011/0185303 A1 | 7/2011 | Katagi et al. |
| 2011/0196546 A1 | 8/2011 | Muller et al. |
| 2011/0204717 A1 | 8/2011 | Shaffer |
| 2011/0208366 A1 | 8/2011 | Taft |
| 2011/0235656 A1 | 9/2011 | Pigeon |
| 2011/0251730 A1 | 10/2011 | Pitt |
| 2011/0257809 A1 | 10/2011 | Forbes et al. |
| 2011/0258022 A1 | 10/2011 | Forbes, Jr. et al. |
| 2012/0057511 A1* | 3/2012 | Sivakumar ............ H04W 28/06 370/310 |
| 2012/0196482 A1 | 8/2012 | Stokoe |
| 2012/0205977 A1 | 8/2012 | Shin et al. |
| 2012/0221162 A1 | 8/2012 | Forbes |
| 2012/0223840 A1 | 9/2012 | Guymon et al. |
| 2012/0232816 A1 | 9/2012 | Oh et al. |
| 2012/0253540 A1 | 10/2012 | Coyne et al. |
| 2012/0259760 A1 | 10/2012 | Sgouridis et al. |
| 2012/0271686 A1 | 10/2012 | Silverman |
| 2012/0296799 A1 | 11/2012 | Playfair et al. |
| 2012/0316697 A1 | 12/2012 | Boardman et al. |
| 2013/0035802 A1 | 2/2013 | Khaitan et al. |
| 2013/0079939 A1 | 3/2013 | Thomas et al. |
| 2013/0079943 A1 | 3/2013 | Darden |
| 2013/0144768 A1 | 6/2013 | Rohrbaugh |
| 2013/0198245 A1* | 8/2013 | Kagan ................ G06F 16/13 707/812 |
| 2013/0329731 A1* | 12/2013 | Gabriel ................ H04L 45/308 370/392 |
| 2014/0025486 A1 | 1/2014 | Bigby et al. |
| 2014/0039703 A1 | 2/2014 | Forbes |
| 2014/0280488 A1 | 9/2014 | Voit et al. |
| 2014/0289381 A1* | 9/2014 | Morton ............... H04L 41/5025 709/221 |
| 2014/0316876 A1 | 10/2014 | Silverman |
| 2015/0052525 A1* | 2/2015 | Raghu .................... H04L 67/10 718/1 |
| 2015/0097697 A1* | 4/2015 | Laval .................... H04L 69/03 340/870.02 |
| 2016/0112310 A1 | 4/2016 | Forbes, Jr. |
| 2019/0058658 A1 | 2/2019 | Forbes, Jr. |

OTHER PUBLICATIONS

Galvin Electricity Institute: Frequently Asked Questions, printed Apr. 23, 2014, same page available through archive.org unchanged Mar. 1, 2008.

GE Digital Energy Residential Electrical Metering Brochure. Sep. 12, 2012. https://web.archive.org/web/20120912144353/http://www.gedigitalenergry.com/products/brochures/1210-Family.pdf.

Illinois General Assembly: Public Act 094-0977, Effective Date: Jun. 30, 2006.

Kamat R., Oren S. Two-Settlement Systems for Electricity Markets under Network Uncertainty and Market Power Journal of Regulatory Economics [serial online]. Jan. 2004; 25(1):5-37.

Lobsenz G. Maryland Regulators Reject BG&E Smart Grid Proposal. Energy Daily [serial online]. Jun. 23, 2010; (118); 3. Available from: Business Source Complete, Ipswich, MA.

Moeller, Mar. 15, 2011, NERC, 116 pages.

Woolf, Tim, Demand Response Compensation in Organized Wholesale Energy Markets, May 4, 2010, NARUC, 34 pages.

United States of America Federal Energy Regulatory Commission (FERC), Order No. 745, "Demand Response Compensation in Organized Wholesale Energy Markets", 134 FERC ¶ 61,187 (issued Mar. 15, 2011) (entire document).

* cited by examiner

SYSTEMS, METHODS, AND APPARATUS FOR COMMUNICATING MESSAGES OF DISTRIBUTED PRIVATE NETWORKS OVER MULTIPLE PUBLIC COMMUNICATION NETWORKS

CROSS-REFERENCES TO RELATED APPLICATIONS

This application is a continuation of U.S. patent application Ser. No. 16/170,735, filed Oct. 25, 2018 and issued as U.S. Pat. No. 10,833,985, which is a continuation of U.S. patent application Ser. No. 14/885,525, filed Oct. 16, 2015 and issued as U.S. Pat. No. 10,116,560, which claims the benefit of U.S. Provisional Patent Application No. 62/066,356, filed Oct. 20, 2014, each of which is in incorporated herein by reference in its entirety.

TECHNICAL FIELD

The present disclosure relates generally to the field of voice, data, and video communications and, more particularly, to system, method, and apparatus embodiments for facilitating the communication of packetized messages within or from distributed private networks over public communication networks operated by corresponding communication service providers.

BACKGROUND

Historically, communications infrastructure and transmission formats utilized by electric grid operators have relied upon technologies that have evolved as control systems have evolved. For example, analog circuits that carried low bit rate packets and information could be carried over plain old telephone service (POTS), microwave communications, and physical links of various types that are known in the art. Over time, both wireline and wireless infrastructure evolved to digital formats that have been the backbone for both privately owned, privately provisioned and public network infrastructures. These digital formats, which are primarily synchronous networks and time division multiplexed (TDM) networks, followed the analog modulation schemes by offering greater capacity over both copper and wireless infrastructure. Such formats also lead to great innovations in speed and reliability with the advent of the synchronous optical network (SONET), digital wireless standards (such as, for example, the Global System for Mobile communications (GSM) and code division multiple access (CDMA)), frame relay protocols, asynchronous transfer mode (ATM) protocols, and many proprietary methods for transporting information digitally. Such digital formats have been beneficially employed to facilitate electrical grid operations, including the overall function, registration, operation, command, control and participation of grid elements and their logical control infrastructure for grid stability and reliability.

In the last ten years, great strides have been made in the telecommunications sectors through use of the Internet Protocol (IP) suite of transport and security protocols and the Open Systems Interconnection (OSI) architecture. Similarly, advances in digital switching have reduced the amount of electronics and physical or virtual connections and multiplexing required to enable use of more efficient asynchronous formats that incorporate various methods for increasing the speed and reliability of IP transport connections. Ethernet connections, which heretofore were generally accepted only for local area network (LAN) connectivity, are now the standard for most data traffic, particularly for IP packets that do not require priority or security, or are for non-critical infrastructure.

More recently, the U.S. Federal Communications Commission (FCC) accepted filings of several telecommunications carriers, local exchange carriers (LECs), and local access and transport area (LATA) carriers (intra-LATA and inter-LATA carriers) who are authorized to transport voice or other "non-information" services traffic to convert the legacy POTS, analog, and synchronous digital (TDM) connections to an IP infrastructure for all connections within the carriers' service territories or FCC granted licensed areas if the carriers are also wireless service providers. The process of conversion has been started in many carriers' core fiber interconnections as the fiber cores have been converted from SONET networks to advanced high speed transport methods, such as Multiple Packet Label Switching (MPLS). Additionally, Signaling System No. 7 (SS7) is being replaced by Session Initiation Protocol (SIP) as the control protocol for setting up, maintaining, and tearing down voice calls, especially over IP networks. The move to newer technologies provides many efficiencies for the carriers and facilitates a more distributed infrastructure for both traditional voice services and data transport services.

Further, FCC action in 2011 dealing with the interconnection of Data over Cable Interface Specification (DOCSIS) for data transport in both synchronous and asynchronous formats of voice, video, and data within fiber or hybrid fiber coax delivery systems and voice service common carriers over pure IP formats (voice-over-IP or "VoIP"), combined with (a) the rollout of third and fourth generation wireless infrastructure (including Long Term Evolution (LTE)) and the soon to be released TIA/IEEE standards for firth generation wireless services, and (b) advances in antenna design and software that have delivered advances in IEEE 802.11-X (a,b,d,g,n and its successors), have increased bit rates that take advantage of IP's inherent routing, reliability, and efficiency.

The FCC has recognized the movements by consumers and businesses to "cut the cord" and use wireless phones as landline replacements, as well as to stop using analog and lower bit rate digital (e.g., TDM) technologies. As a result and unfortunately for traditional wireline common carriers and LECs, the FCC, which has previously classified IP traffic between carriers and Internet Service Providers as an "Information Service" not subject to Federal or State level Public Utility Commission (PUC) oversight, has decided that federal rules regarding VoIP traffic must be re-visited to consider whether the voice component of the VoIP traffic is an "Information Service" or whether it constitutes a service that is subject to new interconnection rules between the carriers, the ISPs, the cable industry, the service-only providers, and the wireless carriers.

There are many drivers for the FCC to take this action. For instance, under previous interconnection rules, carriers that interconnected their voice and or data traffic with each other did so through highly negotiated interconnection agreements. Under these contracts and in accordance with FCC requirements, each carrier from which traffic originated was compensated by the terminating carrier (wireless or wireline) for traffic terminated in the adjacent carrier's network. At the end of a pre-negotiated time frame, generally monthly, the totals for minutes of use, erlangs, or megabits (Mb) delivered were reconciled and inter-carrier compensation (ICC) was awarded to the net provider of "traffic" to the terminating carrier.

Furthermore, some of the charges that all carriers charge their customers on these legacy networks were taxes and fees to fund the build out of rural telecommunications infrastructure. The "Universal Service Fund" (USF) was set up for rural communities and their service providers to have access to federal grant money to fund rural deployments and upgrades with the goal of keeping rural America at the same level of innovation as urban areas. As the aforementioned transitions have taken place, particularly with the introduction of IP transport for voice, video, and data, the fees flowing in the USF fund and, therefore, the money available for grants to rural communities has been dropping drastically for many years, forcing the FCC to re-evaluate its definition of IP based voice services as subject to USF fees.

FIG. 1 provides one example of the typical interconnection of voice and data traffic between two carriers (Wireline Carrier A and Wireline Carrier B, for example) providing wireline telecommunication services to their respective service areas 101, 102. Each carrier includes a respective local access and transport area (LATA) switch 104, 107 (e.g., a Class 4 tandem switch), as well as respective connection end point (CEP), billing, and call accounting functions 105, 108.

When a call originates in the service area 101 of Wireline Carrier A, which may be a large telephone or commercial carrier, and terminates in the service area 102 of Wireline Carrier B, which may be a rural telephone cooperative or rural LEC, the LATA switch 104 for Wireline Carrier A establishes a circuit connection with the LATA switch 107 for Wireline Carrier B. The voice call then proceeds over the established circuit and the CEP/billing/call accounting function 105 for Wireline Carrier A bills for the call, including charging the required USF fee. Similarly, when a call originates in the service area 102 of Wireline Carrier B and terminates in the service area 101 of Wireline Carrier A, the LATA switch 107 for Wireline Carrier B establishes the circuit connection with the LATA switch 104 for Wireline Carrier A. The voice call then proceeds over the established circuit and the CEP/billing/call accounting function 108 for Wireline Carrier B bills for the call, including charging the required USF fee. The two carriers would also be responsible for paying each other ICC as required by the carriers' interconnection agreement. In situations such as those illustrated in FIG. 1, the periodic reconciliation between the large commercial carrier and the much smaller, rural carrier would typically result in the larger carrier (e.g., Wireline Carrier A in FIG. 1) paying the smaller carrier ICC because, due to the much larger quantity of customers in the service area 101 of the larger carrier, more calls would likely originate from the larger carrier's network and terminate in the smaller carrier's network than would originate from the smaller carrier's network and terminate in the larger carrier's network.

In 2012, the FCC issued an order requiring that ICC for VoIP was to no longer be constrained by the definition of every packet that would or could be transported by the Internet or IP infrastructure, whether wireline or wireless, as an "Information Service." The FCC further ordered that all carriers must track VoIP separately from other data services for USF funding under a new so-called "bill and keep" methodology, wherein voice traffic, regardless of its origin and format, would be tracked from the originating network and be billed by the network provider regardless if it is delivered to an adjacent network. In other words, under the FCC's "bill and keep" model, each carrier is required to terminate communications from another carrier for free. The FCC's order also went further in providing that each carrier, regardless of its type, would provide a defined "Point of Interface" (POI) where carriers could pass IP traffic (IP voice or data) from one network boundary or carrier to the next.

An additional issue that has recently been resolved through litigation deals with the concept of "net neutrality" or "open Internet." In 2010, the FCC advised carriers that operated IP networks, Internet service providers (ISPs), or any network providers that passed IP packets that offering "Priority Access," which would take advantage of the IP protocol's natural OSI protocols to order packets in the most important order as determined by the carrier and the application, would not be permitted. The FCC's order was controversial as it allowed for pure applications companies to utilize carrier networks to transport bandwidth intensive services regardless of their impact to the overall speed, reliability, and capacity of the transport links. Companies that offer bandwidth intensive applications (e.g. music, video, or live streaming) would have in effect, under "net neutral" protocols, the same priority of transport as private and public entities providing critical infrastructure applications, such as emergency services, electrical grid operations, potable water supply operations, and natural gas supply operations.

In response to the FCC's net neutrality requirement, grid operators, utilities, and market participants constructed private networks for their operations to insure that their traffic, carried either through their own transport (wireless, fiber, copper etc.) or through transport leased from commercial carriers, had priority over being carried within the public or common carrier infrastructure. Where private infrastructure was used, additional cost was incurred by the private network operators for dark fiber, dedicated network capacity, private radio networks, and leased lines, for example.

In 2013, a federal appeals court struck down the FCC's net neutrality requirement after the FCC was sued by a combination of carriers. The court affirmed the carriers' ability to define the uses of their networks and charge, provision and allocate resources, including priority access, as the network carriers and providers saw fit, subject to the FCC's requirements for differentiating and accounting for VoIP as a service for purposes of paying USF fees and subject to the FCC's "bill and keep" model for carrier interconnection.

In view of the court's decision on net neutrality, network carriers have sought federal approval to decommission their legacy POTS, TDM, Frame Relay, ATM, SONET, and other networks in favor of using IP networks. The legacy networks have historically been used by electrical grid participants and users of other distributed private networks (e.g., public safety networks). As a result, grid participants and other affected private network users will have to re-design their networks as secure IP networks before 2020.

With the movement of telecommunications carriers to IP transport and the ability for the carriers to define new points of interface, a need has arisen for new methods and apparatus to enable distributed private networks, such as, for example, the electric power grid and other critical infrastructure networks, to communicate messages over public IP networks while maintaining the security and priority requirements of each particular distributed private network.

SUMMARY

The present invention is directed to systems and methods for communicating messages of distributed private network (DPN) over a plurality of communication networks for critical infrastructure, the system comprises at least one of an inter-network interface and a message coordinator. The inter-network interface comprises at least one network interface, a processing function and a memory. The message coordinator comprises at least one network interface, a processing device and a memory. The inter-network interface is communicatively coupled to the message coordinator. The inter-network interface is operable to receive a packetized message from a first DPN network element over a first communication network. The message coordinator is operable to receive the packetized message from the inter-network interface; assign at least a transport route for the packetized message; and communicate the packetized message to a second DPN network element based on the assigned transport route over a second communication network.

DETAILED DESCRIPTION

Figure 1:
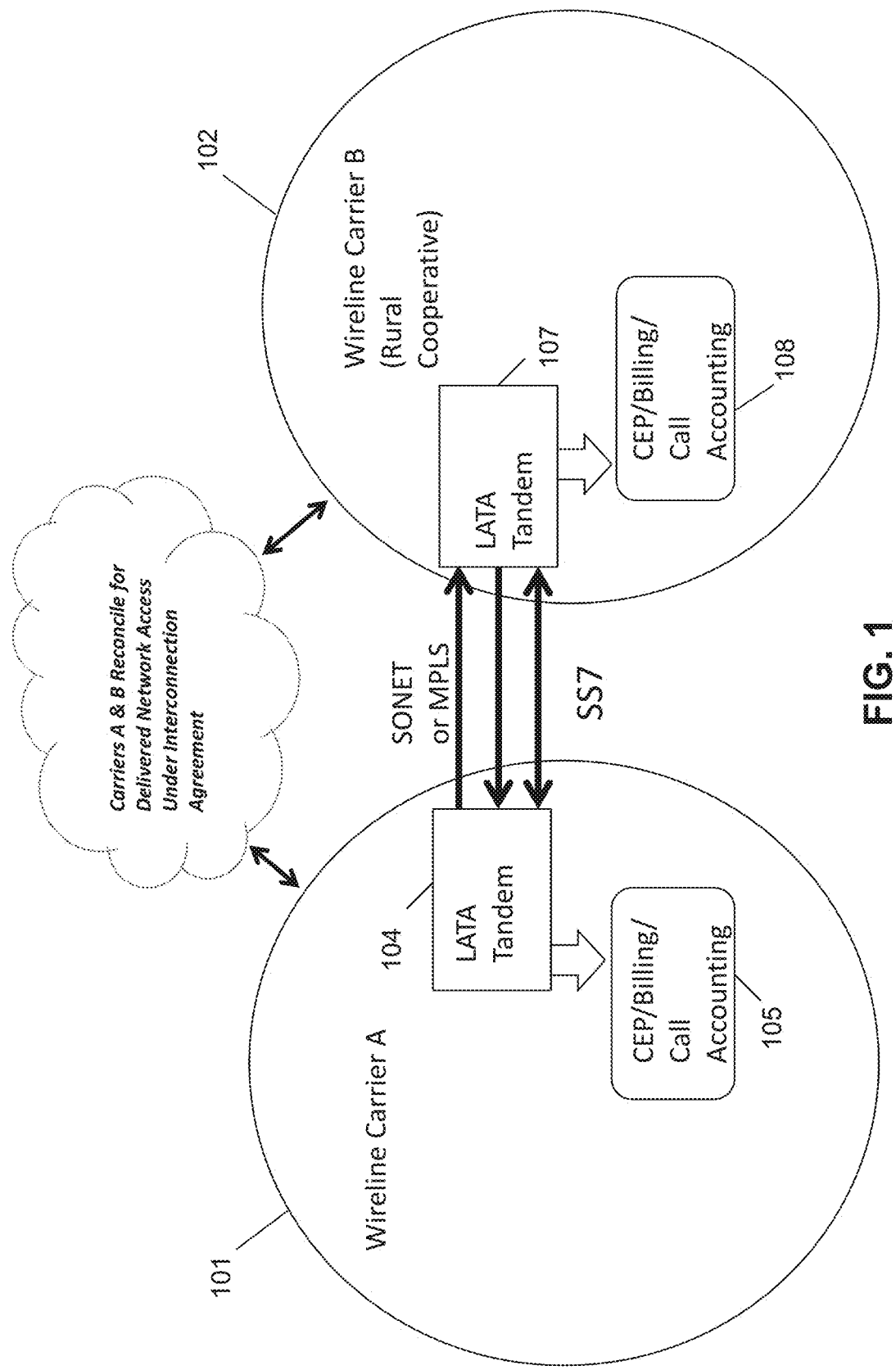
FIG. 1 is a block diagram showing a PRIOR ART conventional interconnection between two telecommunications carriers.

Systems and methods of the present invention provide for communicating messages or packets of a distributed private network (DPN) over a plurality of communication networks including an inter-network interface and a message coordinator communicatively coupled. The inter-network interface is operable to receive a packetized message from a first DPN network element over a first communication network. The message coordinator receives the packetized message from the inter-network interface, assigns at least a transport route for the packetized message; and communicates the packetized message to a second DPN network element based on the assigned transport route over a second communication network. The message coordinator is further operable to assign priority protocol and security protocol to the packetized message.

The present invention may further include elements of systems and methods for messaging as described within U.S. patent application Ser. No. 13/563,535 filed Jul. 31, 2012 and published as US Patent Publication No. 2014/0039699 for "SYSTEM, METHOD, AND APPARATUS FOR ELECTRIC POWER GRID AND NETWORK MANAGEMENT OF GRID ELEMENTS," and U.S. patent application Ser. No. 14/290,598 filed May 29, 2014 and published as US Patent Publication No. 2014/0277788 for "SYSTEM, METHOD, AND DATA PACKS FOR MESSAGING FOR ELECTRIC POWER GRID ELEMENTS OVER A SECURE INTERNET PROTOCOL NETWORK," both by inventor Forbes, Jr., which are incorporated herein by reference in their entirety.

According to one embodiment, a method is provided for communicating messages of one or more distributed private networks over a plurality of public communication networks operated by a corresponding plurality of communication service providers. The one or more distributed private networks include network elements distributed throughout service areas of the public communication networks. According to this embodiment, an inter-network interface receives packetized messages from the public or private communication networks, wherein at least one of the received packetized messages is directed to a network element of a distributed private network. The inter-network interface acts as a sole point of demarcation for interconnecting network elements of the distributed private network through the public communication networks. The inter-network interface communicates the packetized message or messages directed to network elements of the distributed private network to a message coordinator for the distributed private network. The message coordinator is operable to provide at least one of routing, prioritization, and security functions for the packetized messages communicated over the public or private communication networks to network elements of the distributed private network. The message coordinator may form part of the inter-network interface, be co-located with the inter-network interface, or may be communicatively coupled to the inter-network interface, but located separate from the inter-network interface. Functions of the message coordinator are performed by one or more of network elements of the distributed private network to effect a distributed message coordinator. The distributed private network may be a critical infrastructure network, such as, for example, a network for supplying and delivering electricity (e.g., an electrical grid or a network of an entity that supplies power to, controls the distribution of power over, or maintains the stability and reliability of an electrical grid), a network for supplying and delivering natural gas, a network for supplying and delivering potable water, a network used for providing public safety services, a network used for providing local or national security services, or a network used for communicating emergency information.

In another embodiment, an inter-network interface is provided to facilitate the communication of messages of distributed private networks over a plurality of public communication networks. The inter-network interface includes at least one network interface (which may be at least one transceiver), memory, and a processing function. The inter-network interface functions as a sole point of demarcation for interconnecting the distributed private networks through the communication networks, in particular for public communication networks. The at least one network interface or transceiver transmits and receives packetized messages to and from the communication networks. The memory stores operating instructions and routing tables. The processing function is operable in accordance with the stored operating instructions to: (a) receive from the at least one network interface transceiver packetized messages from the public communication networks, wherein at least one packetized message is directed to a target network element of a distributed private network, and (b) communicate, via the at least one network interface or transceiver and according to the routing tables, the packetized message to a message coordinator for the distributed private network. The message coordinator is operable to provide routing, prioritization, and/or security functions for packetized messages communicated over the public communication networks to network elements of the distributed private network. The processing function is further operable in accordance with the operating instructions to extract data from the packetized message to produce extracted data; transform the extracted data into transformed data usable by a first network element of the distributed private network; and communicate via the at least one network interface or at least one transceiver a secure packetized message to the first network element based on one or more routing tables, security protocol, priority protocol. The secure packetized message includes the transformed data.

In a further embodiment, a method is provided for communicating messages of a distributed private network over a plurality of communication networks operated by a corresponding plurality of communication service providers. According to this embodiment, a message coordinator of the distributed private network receives a packetized message from an inter-network interface controlled by a first communication service provider or an independent private network message aggregator. The packetized message originated from a first network element of the distributed private network. The network element that sent the message is serviced by a first public communication network operated by a second communication service provider. The message coordinator assigns at least a transport route (and optionally a priority and/or a security protocol) for the packetized message, wherein the assigned transport route requires the packetized message to be communicated over a second public communication network operated by a third communication service provider. The message coordinator communicates the packetized message to the inter-network interface for further communication of the packetized message to a second network element of the distributed private network based on the assigned transport route for the packetized message. In this case, the second network element, which is the intended target of the packetized message, may be located within a service area of the second public communication network.

In yet another embodiment, a system is provided for communicating messages of a distributed private network over a plurality of public communication networks operated by a corresponding plurality of communication service providers. According to this embodiment, the system includes an inter-network interface and a message coordinator. The inter-network interface functions as a sole point of demarcation for interconnecting network elements of the distributed private network through the communication networks. The inter-network interface is operable to receive a packetized message from a communication network operated by a first communication service provider. The packetized message is directed to at least a first network element of the distributed private network. The message coordinator is communicatively coupled to the inter-network interface and operable to receive the packetized message from the inter-network interface. The message coordinator is further operable to provide at least one of routing, prioritization, and security functions for communicating the packetized message to the first network element over one or more of the public or private communication networks.

In a further embodiment, a method is provided for communicating messages of a distributed private network over public communication networks operated by a corresponding set of communication service providers. According to this embodiment, an inter-network interface receives a packetized message from a public or private communication network operated by a first communication service provider (e.g., a smaller carrier, such as a rural LEC, a rural or lower class of service ISP, or a rural VoIP provider). The inter-network interface functions as a sole point of demarcation for interconnecting the distributed private network through the public communication networks. The inter-network interface may be controlled by a second communication service provider (e.g., a large commercial carrier) or an independent private network message aggregator. The packetized message is directed to at least a first network element of the distributed private network. The inter-network interface communicates the packetized message to a message coordinator for the distributed private network. The message coordinator may be a software function running on a processor used to implement some or all of the inter-network interface or may be software running on a processor of a separate hardware device (e.g., in a data center of the distributed private network or on a cloud server). Responsive to receiving the packetized message, the message coordinator assigns a transport route (and optionally a priority and/or a security protocol) to the packetized message to produce a route-assigned message. The message coordinator then communicates the route-assigned message to a packet router, which may be controlled by the second communication service provider or the independent private network message aggregator. The packet router, which may also be implemented in software and run on a processor of the inter-network interface or the message coordinator, determines the transport route (and optionally the priority and/or security protocol) from the route-assigned message and selects, based on the determined transport route (and priority and/or security protocol (when included in the route-assigned packet)), a public communication network over which to communicate the packetized message to the first network element of the distributed private network.

In a further embodiment, a method is provided for communicating messages of a distributed private network over public communication networks operated by a corresponding set of communication service providers. According to this embodiment, a first inter-network interface element receives a packetized message from a first public communication network operated by a first communication service provider. The first inter-network interface element forms part of a multi-element, inter-network interface that is a sole point of demarcation for interconnecting the distributed private network through the public communication networks. The packetized message is directed to at least a first network element of the distributed private network. The first inter-network interface element communicates the packetized message to a message coordinator for the distributed private network. The message coordinator assigns at least a transport route to the packetized message to produce a route-assigned message and communicates the route-assigned message to a packet router. The packet router determines the transport route for the packetized message from the route-assigned message and selects, based on the transport route, a second public communication network over which to communicate the packetized message to the first network element of the distributed private network. The second public communication network is operated by a second communication service provider and the first network element of the distributed private network receives communication service from the second public communication network. After determining the transport route, the packet router communicates the packetized message to a second inter-network interface element that is coupled to the second public communication network. The second inter-network interface element also forms part of the multi-element, inter-network interface. The second inter-network interface element then communicates the packetized message to the second public communication network for delivery to the first network element of the distributed private network. The processing function is operable to determine a message coordinator to which to route a packetized message based on a distributed private network that includes a network element to which the packetized message is directed; determine whether a preferred transport route is available for routing the packetized message to the message coordinator; route the message to the message coordinator according to a preferred transport route when the preferred transport route is available; and route the packetized message to the message coordinator according to an alternative transport route that includes the second inter-network interface element when the preferred transport route is unavailable.

In yet another embodiment, a network element is provided for use in a distributed private network that communicates packetized messages over a plurality of public communication networks. According to this embodiment, the network element includes a at least one network interface transceiver, memory, and a processing device or function. The at least one network interface transceiver communicates packetized messages to an inter-network interface over a public communication network operated by a first communication service provider. The inter-network interface is a sole point of demarcation for interconnecting the distributed private network through the public communication networks. The memory is operable to store executable operating instructions for formatting the packetized messages for communication within the distributed private network and applying a security protocol specified by the distributed private network. The processing device is operably coupled to the at least one network interface or transceiver and the memory, and operable in accordance with the operating instructions to: (a) generate one or more packetized messages directed to a target network element of the distributed private network, (b) encrypt each packetized message based on the security protocol to produce an encrypted message, and (c) communicate the encrypted message to the at least one network interface or transceiver. Each packetized message includes a messaging format used in one or more lower protocol layers of the packetized message, wherein the messaging format identifies the packetized message as being a message communicated within the distributed private network.

Before describing in detail exemplary embodiments of systems, methods, and apparatus for communicating messages of distributed private networks over multiple public communication networks, one skilled in the art should recognize that such embodiments may reside in combinations of system and apparatus components and/or their operational software (including firmware, middleware, and applications). Accordingly, the systems, apparatus, and method step components have been represented where appropriate by conventional symbols in the drawings, showing only those specific details that are pertinent to understanding the disclosed embodiments so as not to obscure the disclosure with details that will be readily apparent to those of ordinary skill in the art having the benefit of the description provided herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

As used herein and in the appended claims, "public communication network" means any wired, wireless, cable, satellite, optical, or other network operated by a communication service provider that offers use of the network for a fee. Public communication networks include, but are not limited to, Ethernet networks, circuit-switched telecommunications networks, packet-switched telecommunications networks, digital subscriber line (DSL) networks, voice-over-IP (VoIP) networks, Code Division Multiple Access (CDMA) networks, Global System for Mobile Communications (GSM) networks, Universal Mobile Telecommunications System (UMTS) networks, Enhanced Data Rates for GSM Evolution (EDGE) networks, networks that utilize third generation (3G) wireless data protocols, such as Evolution for Data Only (EVDO) and High Speed Packet Access (HSPA), networks that utilize fourth generation (4G) wireless data protocols, such as Long Term Evolution (LTE), networks that utilize fifth generation (5G) networks that operate in accordance with the IEEE 802.11 standard (WiFi networks) or any derivative standard approved by the IEEE, International Telecommunications Union (ITU) or any domestic or international standards body, or networks that use proprietary protocols which can operate in real time or near real time and can support the transmission of packetized messages (e.g., Internet Protocol (IP) packets).

As also used herein, "distributed private network" means any non-public network that includes network elements distributed throughout the service areas of two or more public communication networks and which use the voice and/or data services of the public communications networks. Exemplary distributed private networks include, but are not limited to, critical infrastructure networks, such as networks for supplying and delivering electricity, networks for supplying and delivering natural gas, networks for supplying and delivering potable water, networks used for providing public safety services, networks used for providing local or national security services, and networks used for communicating emergency information. Distributed private networks also include subnetworks of larger composite networks. For example, an electrical grid (a large composite distributed private network) may be composed of multiple subnetworks (e.g., smaller distributed private networks operated by entities that supply power to the electrical grid, control use and/or distribution of power from the electrical grid, and/or maintain all or part of the electrical grid (e.g., independent system operators)). Where subnetworks are involved, each subnetwork may receive communication service from one or more of the public communication networks.

As further used herein, "network element" means any hardware and/or software module, process, or device which participates and/or functions in a distributed private network. For example, but not by way of limitation, a network element for an electrical grid may be a smart meter, a substation controller, an Automatic Generation Control (AGC) process or subsystem, an Energy Management System (EMS), advanced metering infrastructure (AMI) processes and subsystems, an advanced meter reading (AMR) collector, or any other element, component, process, or device that transmits or receives grid-related data or information.

As also used herein, "message coordinator" means any hardware and/or software module, process, or device that controls, manages, routes, prioritizes, and otherwise processes packetized messages communicated between network elements of a distributed private network, and/or originates packetized messages for delivery to networks elements of the distributed private network. Thus, a message coordinator does not merely function as a traditional network layer router, but rather includes messaging, management, and control functionality required for properly facilitating the exchange of packetized messages within a distributed private network according to the prioritization, routing, and security requirements of the distributed private network. Segmentation of the packetized message complies with security requirements of the distributed private network. The message coordinator may be implemented within a dedicated hardware device or may be implemented as a secure cloud service.

The systems, methods, and apparatus of the present disclosure can be more readily understood with reference to FIGS. 2-8, in which like reference numerals designate like items. The figures are provided for illustration purposes for embodiment illustrations and are not intended to limit the invention thereto.

Figure 2:
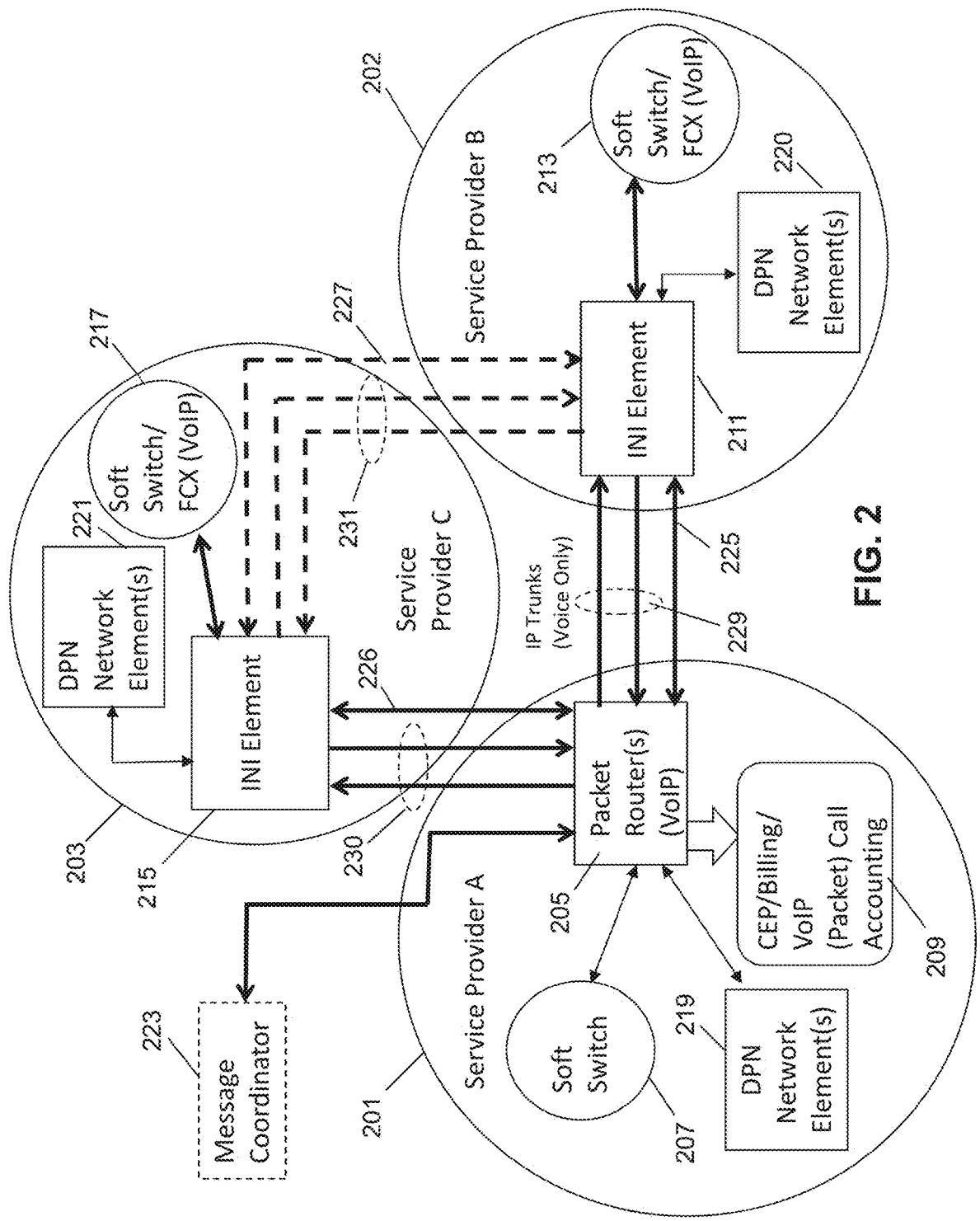
FIG. 2 is a block diagram illustrating configuration of a system for communicating messages of one or more distributed private networks over multiple public communication networks operated by corresponding communication service providers, in accordance with an exemplary embodiment of the present disclosure.

FIG. 2 is a block diagram illustrating a new high level architecture for a system that communicates messages of one or more distributed private networks over multiple public communication networks operated by respective communication service providers, in accordance with an exemplary embodiment of the present disclosure. The system architecture illustrated in FIG. 2 includes one or more inter-network interfaces, one or more message coordinators 223 (one shown for illustration purposes), and a packet router 205 (which may form part of the inter-network interface or be controlled by an entity that controls the inter-network interface). According to one embodiment of this new architecture, each inter-network interface is a sole point of demarcation for interconnecting network elements 219-221 of a distributed private network through the public communication networks. In other words, all distributed private network traffic flows through an inter-network interface to a message coordinator 223 for the particular distributed private network (DPN). In this manner, appropriate prioritization, security, and/or routing of DPN messages can be handled appropriately according to the specific requirements of the particular distributed private network. According to an exemplary embodiment, the inter-network interface may be provided or controlled by a host communication service provider (e.g., Service Provider A as shown in FIG. 2), a third party, such as an independent private network message aggregator.

In the embodiment illustrated in FIG. 2, the inter-network interface (INI) includes multiple elements 211, 215 distributed within the service areas 201-203 of some or all of the public communication networks. In service area 201, the packet router 205 may include and/or serve as the INI element for that service area 201. Alternatively, the inter-network interface may be a single device positioned in the service area of a public communication network. The inter-network interface interconnects network elements 219-221 of a distributed private network through the public communication networks. The inter-network interface may include one or more points of interface (POIs) and/or may support multiple independent and dedicated subnetworks to facilitate the efficient communication of DPN messaging based on prioritization and security requirements of the particular supported distributed private networks. For example, each distributed private network may be assigned to its own subnetwork for processing by the inter-network interface. Additionally, each distributed private network may include its own message coordinator 223 or message coordinator function. Where the inter-network interface is controlled by a host communication service provider, such as a large commercial carrier, the host provider may distribute and install the INI elements 211, 215 at boundaries of the service areas 202, 203 of the other public communication networks and at such other location as may be appropriate, such as at locations of fixed critical infrastructure where the inter-network interface supports packetized messages of a critical infrastructure network.

The three public communication networks illustrated in FIG. 2 are operated by three communication service providers (Service Provider A, Service Provider B, and Service Provider C). Each public communication network provides communication service to a corresponding service area 201-203. Those of ordinary skill in the art will readily recognize and appreciate that the quantity of public communication networks and associated service areas may be more or less than the quantity shown for illustration purposes in FIG. 2. The description provided below will focus primarily on an exemplary embodiment in which a packet router 205 and INI elements 211, 215 are positioned within service areas 201-203 of three public communication networks to illustrate the architecture and operation of the disclosed systems, methods, and apparatus.

In FIG. 2, the service areas 201-203 of the public communication networks are illustrated as being geographically disjoint or separate. However, the service areas 201-203 may alternatively overlap or overlay one another either wholly or partially. For example, a wireless public communication network may overlap or overlay another wireless public communication network or a wired (e.g., cable, DSL, fiber, etc.) public communication network. The disclosed systems, methods, and apparatus may be applied for communicating messages of one or more distributed private networks over the public communication networks regardless of whether or not the service areas 201-203 overlap.

The inter-network interface may include the message coordinator 223 or be collocated therewith, or the two devices/functions may be geographically separate and communicatively coupled together over a dedicated communication link. Alternatively, the function of the message coordinator 223 may be distributed within the packet router 205 and/or the INI elements 211, 215 that support the distributed private network in which the message coordinator 223 functions.

Further, the message coordinator block depicted in FIG. 2 is intended to be a very general functional block and is not intended to suggest that only one message coordinator is to be used under the illustrated system architecture. According to one embodiment, each distributed private network is managed by its own message coordinator or message coordinator function, and multiple distributed private networks may simultaneously exist and communicate over the same set of public communication networks. As a result, the message coordinator 223 represents all the message coordinator functions that may be required to support the particular quantity of distributed private networks operating simultaneously. To more easily handle the flows of packetized data messages flowing within the various distributed private networks, each distributed private network may be assigned to a separate subnetwork or subnet within the inter-network interface, where the subnet for a particular distributed private network is then interconnected with the message coordinator for that particular distributed private network.

According to the exemplary embodiment depicted in FIG. 2, the public communication network operated by Service Provider A includes a CEP/billing/call accounting function 209 (including call accounting for VoIP or other digitized voice calls, where Service Provider A provides VoIP/digitized voice calling services) and, when the public network supports VoIP calling services, a software (soft) switch 207 for interconnecting VoIP calls to and from VoIP subscribers within the network's service area 201. According to one embodiment, the CEP/billing/call accounting function 209 and the softswitch 207 are communicatively coupled to a packet router 205 (which may incorporate an INI element as discussed above). The packet router 205 exchanges packetized messages with network elements 219 of one or more distributed private networks using the communication resources of the public communication network so long as the DPN network elements 219 are located within Service Provider A's service area 201.

According to another embodiment, one or more DPN network elements 219-221 may be transportable or mobile, if so permitted by their respective distributed private networks. In such a case, a transportable DPN network element 219 may register with the message coordinator 223 for the distributed private network (or with the inter-network interface that includes the message coordinator function), via the packet router 205 or another INI element, prior to receiving any DPN-related packetized messages from the message coordinator 223. If the transportable DPN network element 219 later moves into the service area of another public communication network (e.g., from service area 201 to service area 202), the DPN element 219 may re-register with the message coordinator 223 by sending a new registration message to the message coordinator 223 through the INI element 211 serving the new service area 202. Upon receipt of the new registration message, the message coordinator 223 (or inter-network interface, as applicable) may change the transport route and/or priority to appropriately route and prioritize packetized messages sent to the DPN network element 219 while it is located within the new service area 202.

Figure 3:
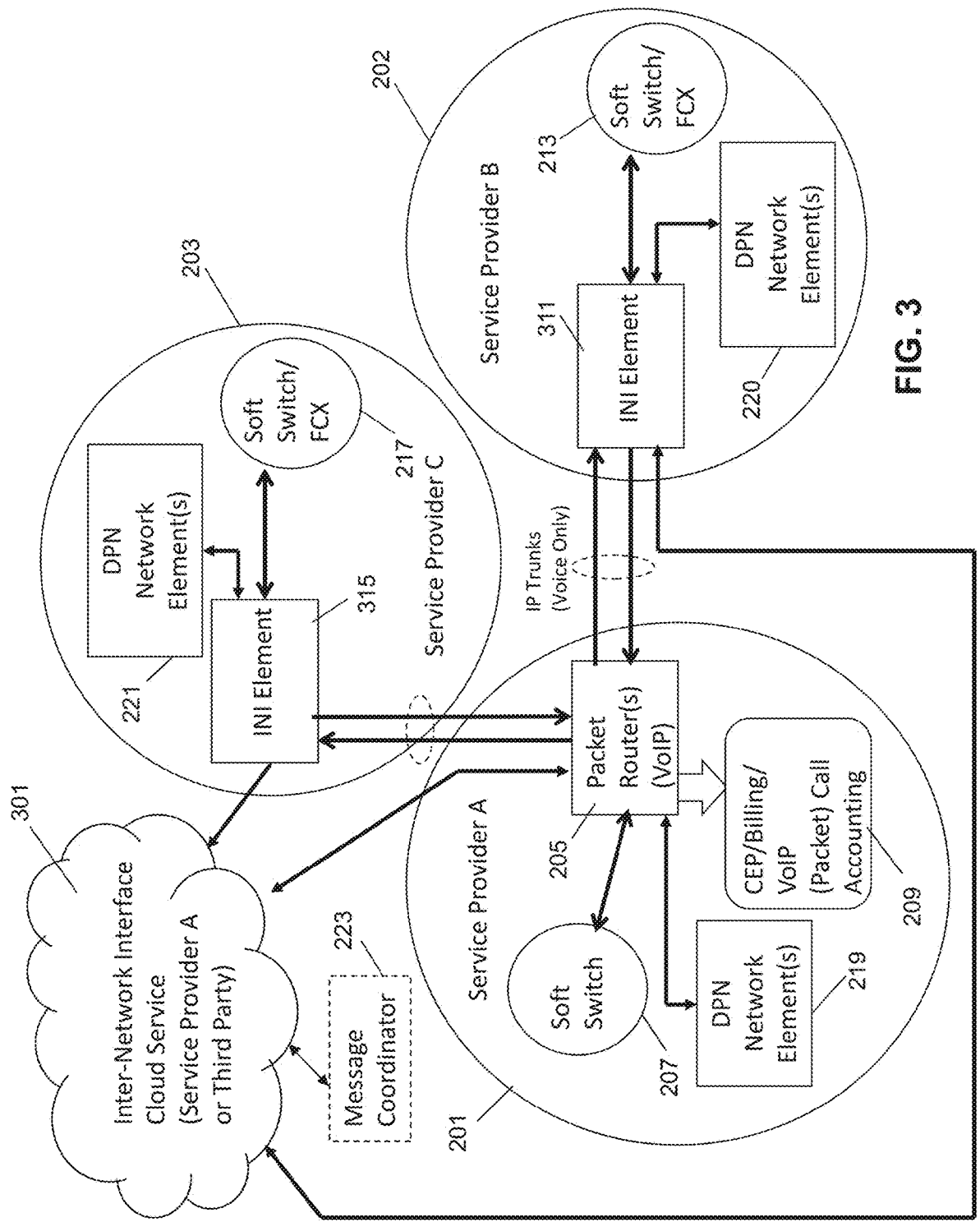
FIG. 3 is a block diagram illustrating configuration of a system for communicating messages of one or more distributed private networks over multiple public communication networks operated by corresponding communication service providers, in accordance with another exemplary embodiment of the present disclosure.

The public communication networks operated by Service Provider B and Service Provider C may similarly include respective CEP/billing/call accounting functions (not shown) and VoIP softswitches and/or foreign exchanges 213, 217 for interconnecting VoIP calls to or from VoIP subscribers within each network's respective service area 202, 203. Alternatively, one service provider (e.g., Service Provider A) may provide VoIP call accounting for one or more other service providers and periodically (e.g., monthly) report back to the billing systems of the other service providers the quantities, durations, and/or sizes of VoIP packetized messages (VoIP packets) that passed through the inter-network interface during a predefined billing period so as to enable the other service providers to determine the amount of funds to be paid by them to a rural telephony assistance fund, such as the USF, if so required under applicable communications regulations. For example, a large commercial carrier (e.g., the carrier providing communication service in service area 201) may supply all the inter-network interface elements 211, 215 and install them within the service areas 202-203 of the other communication service providers. Each INI element 211, 215 may include one or more data POIs to support packetized data messages and one or more VoIP POIs to support VoIP communications. The packetized data message communication is configured as a first independent subnetwork supported by the inter-network interface. The VoIP communication services are configured as a second independent subnetwork supported by the inter-network interface. Each independent subnetwork has a physical layer separate from every other independent subnetwork so as to provide physical, routable, and self-healing capabilities. The physical layer separation is maintained by the packet router for each independent subnetwork. Every month or at other predefined times, VoIP call data for VoIP calls passing through the VoIP POIs within the inter-network interface may be reported to the billing systems of Service Providers B and C to enable them to make their USF payments under, for example, the FCC's "bill and keep" model.

Where the inter-network interface is a multi-element interface with INI elements 211, 215 distributed throughout the service areas 201-203 of the public communication networks, each INI element 211, 215 or multiple INI elements may be located within a respective one of the service areas 201-203. The INI elements 211, 215 may be communicatively coupled together such that packetized data links 225, 226 interconnect the packet router 205 to the remote INI elements 211, 215. Additionally, where the inter-network interface supports VoIP or other digitized voice services, the VoIP-supporting portion or portions of each INI element 211, 215 (e.g., VoIP POI) may be further coupled to the VoIP-supporting portion or portions of the packet router 205 through IP/VoIP trunks 229, 230. Where VoIP service is supported, the packet router 205 and each INI element 211, 217 may be coupled to a VoIP softswitch 207, 213, 217 for the public communication network in which the packet router 205 or INI element 211, 215 is located. The packet router 205 or the message coordinator 223 may use session initiation protocol (SIP) as the protocol for processing and managing VoIP communications occurring through the inter-network interface.

Where the inter-network interface includes multiple INI elements 211, 215, the INI elements 211, 215 may be configured in a hub-and-spoke architecture, such that the packet router 205 or message coordinator 223 serves as the hub through which all distributed private network and optionally VoIP traffic flows. An exemplary hub-and-spoke architecture is illustrated in FIGS. 2 and 3, where optional data links 227 and VoIP trunks 231 are excluded from the architecture of FIG. 2. Alternatively, the INI elements 211, 215 may be configured in a ring architecture to provide enhanced reliability and redundancy in the event that a preferred link between any two INI elements is unavailable for any reason. An exemplary ring architecture is illustrated in FIG. 2 when optional data links 227 and VoIP trunks 231 (if VoIP service is supported) are included in the architecture to interconnect INI element 211 to INI element 215. By using a ring architecture for the INI elements 211, 215, if a data link or VoIP trunk between any two INI elements is unavailable for any reason, the data or VoIP packets may be re-routed through one or more of the other INI elements to maintain system performance. For example, when using a ring architecture for interconnecting the INI elements 211, 215 to the packet router 205 (or the message coordinator 223, for example, via the packet router 205), an INI element (e.g., INI element 211) may receive a packetized message from a DPN network element 220 and determine whether a preferred communication path 225 between the INI element 211 and the message coordinator 223 is available for communicating the packetized message to the message coordinator 223. If the preferred path 225 is available, the INI element 211 communicates (e.g., using a packetized messaging protocol, such as TCP/IP) the packetized message to the message coordinator 223 via the preferred communication path 225. Alternatively, if the preferred communication path 225 is unavailable for any reason, the INI element 211 may be configured through software to communicate the packetized message to the message coordinator 223 via an alternative communication path 227, 226, such as via one or more other INI elements 215. A routing table may be stored in each INI element 211, 215 for use in determining an alternate path when the preferred communication path between the INI element and the message coordinator 223 or packet router 205 is unavailable.

The message coordinator 223 for a distributed private network may be a processor-based standalone device, a server instance or resource on a shared platform (e.g., such as a cloud server or set of cloud servers), or a software function or module operating as a process integrated into the inter-network interface or the packet router 205. When integrated with the inter-network interface, the message coordinator function may be a centralized process (e.g., in a host server or a single INI element) or be a distributed process running in multiple INI elements of the inter-network interface. In FIG. 2, the message coordinator 223 is illustrated in exemplary form as being either standalone or a function module running within the packet router 205.

Some large-scale distributed private networks, such as electrical grids, may include several smaller distributed private networks that exchange data, information, and operations messages with one another. To handle such cross-network message exchanges, the message coordinators 223 for the smaller distributed private networks are configured to translate and appropriately route and prioritize messages received from one distributed private network to another distributed private network, especially (although not exclusively) where the smaller distributed private networks effectively participate and function in a much larger distributed private network. For example, a DPN element of a first distributed private network (e.g., an EMS system of a first electric utility) may submit a request or provide information (e.g., through an Inter-control Center Communications Protocol (ICCP) message) to a DPN element of a second distributed private network (e.g., an EMS of a second electric utility), where the two smaller distributed private networks are components of a larger distributed private network (e.g., a regional or national electrical grid). In such a case, the message coordinators of the smaller distributed private networks may provide message translation, routing, and/or prioritization for purposes of communicating the contents of the received message (e.g., request or information) to a target DPN element in the other distributed private network.

For example, an inter-network interface of a first distributed private network (e.g., first electric utility) may receive an operations message (e.g., ICCP message) from a message coordinator for a second distributed private network (e.g., second electric utility), where the operations message is directed to a target DPN network element (e.g., EMS) within the first distributed private network or a target DPN network element (e.g., EMS) within a third distributed private network. The operations message may be a message informing of an updated status, attribute, function, or participation of a DPN network element within the second distributed private network (e.g, updated status of a generator in the second utility). Additionally, the operations message may include the transport route and priority for communicating the operations message or its contents to the target DPN network element. In such a case, the message coordinator for the second distributed private network may communicate the operations message or a new, translated version thereof, as applicable and with the appropriate routing and priority, to the public communication network that provides packetized message service to the particular target DPN network element. Alternatively, the message coordinator for the second distributed private network may provide the operations message or a translated version thereof to the message coordinator for the target distributed private network (first or third, as applicable) to enable the latter message coordinator to properly process the operations message within its distributed private network.

To further illustrate cross-DPN messaging as supported by the architecture of FIG. 2, a DPN network element 221 of a first distributed private network sends a packetized message intended for a DPN network element 220 of a second distributed private network. The original message is received by the INI element 215 located in the service area 203 of the public communication network serving the sending DPN network element 221. The INI element 215 communicates the received message to the message coordinator for the first distributed private network. The message coordinator for the first distributed private network determines that the message is intended for a DPN network element of a second distributed private network and either communicates the message with an assigned priority and transport route to the message coordinator for the second distributed private network or translates the message into a format used in the second distributed private network and communicates the translated message, which includes the payload or other critical contents of the original message, as well as a priority and a transport route, to an INI element of the second distributed private network. The INI element of the second distributed private network communicates the translated message or a new message based on the translated message to the public communication network providing communication service to the target DPN network element.

Where the architecture for the inter-network interface is such that the inter-network interface includes multiple INI elements 211, 215 as illustrated in FIG. 2, each INI element may perform limited processing on a received packetized message in order to properly format it for transmission to the message coordinator for the distributed private network in which the message was sent or to the DPN network element that is the target of the message. Therefore, where a first INI element (e.g., INI element 215) receives a packetized message from a DPN network element 221, the first INI element forwards the message or a modified version of it (e.g., with modified headers or addressing) to the message coordinator 223 for the applicable distributed private network. The message coordinator then provides appropriate routing, prioritization, and security functions for the received message, such as by selecting and assigning the appropriate transport route and priority for the message, as well as adding or authenticating/validating the appropriate security protocol. Where, for example, the security protocol for the message has been applied by the sending DPN network element 221 (e.g., through appropriate encryption), the message coordinator 223 for the distributed private network may validate the security protocol before routing the message to the INI element in the service area of the public communication network providing communication service to the target DPN network element (e.g., DPN network element 220). Alternatively, where the message received from the sending DPN network element 221 does not include the appropriate security protocol for delivery of the message to the target DPN network element, the message coordinator 223 may add the required level of security to the message before sending the modified message to the delivery INI element (e.g., INI element 211). The transport route assigned by the message coordinator 223 may be based on the contents of the message, a priority for the message, or other factors as may be programmed into the message coordinator based on the requirements for the particular distributed private network. For example, where the distributed private network is a network for an electrical utility or an electrical grid and the DPN network elements between which the packetized message is to be exchanged are grid elements, the security protocol may be required to comply with the North American Electric Reliability Corporation Critical Infrastructure Protection (NERC CIP) standards.

After the message coordinator 223 processes the packetized message, the message coordinator 223 communicates a new or modified message containing the contents of the original message, a priority, and a transport route to an INI element 211 in the service area 202 containing the target DPN network element 220. The INI element 211 receives the packetized message from the message coordinator 223 and, based upon the message's priority and transport route, either forwards the received message to the public communication network providing packetized message service to the target DPN network element 220 or generates a new packetized message (e.g., the received message with modified addressing) and communicates the new message to the public communication network servicing the target DPN network element 211.

FIG. 3 is a block diagram illustrating configuration of a system for communicating messages of one or more distributed private networks over multiple public communication networks operated by corresponding communication service providers, in accordance with another exemplary embodiment of the present disclosure. The system architecture embodiment illustrated in FIG. 3 is similar to the architecture embodiment illustrated in FIG. 2, except that the inter-network interface is implemented wholly or partially as a cloud service 301 provided by a host communication service provider (e.g., Service Provider A) or a third party, such as an independent private network message aggregator.

Where the inter-network interface for a particular distributed private network is implemented as a cloud service 301, the message coordinator 223 may also be implemented as part of the cloud service 301 or may be alternatively coupled to the cloud service (e.g., interconnected with the applicable cloud servers) via appropriate data links. In this embodiment, the packet router 205 and the distributed INI elements 311, 315 are coupled to the cloud service through respective Internet service providers (ISPs). INI elements 311, 315 are similar to INI elements 211, 215 of FIG. 2, except that the INI elements 311, 315 of FIG. 3 are interconnected with the cloud service and may utilize Internet-based security mechanisms, such as secure socket layer encryption for all communications between the INI elements 311, 315 and the cloud service.

Figure 4:
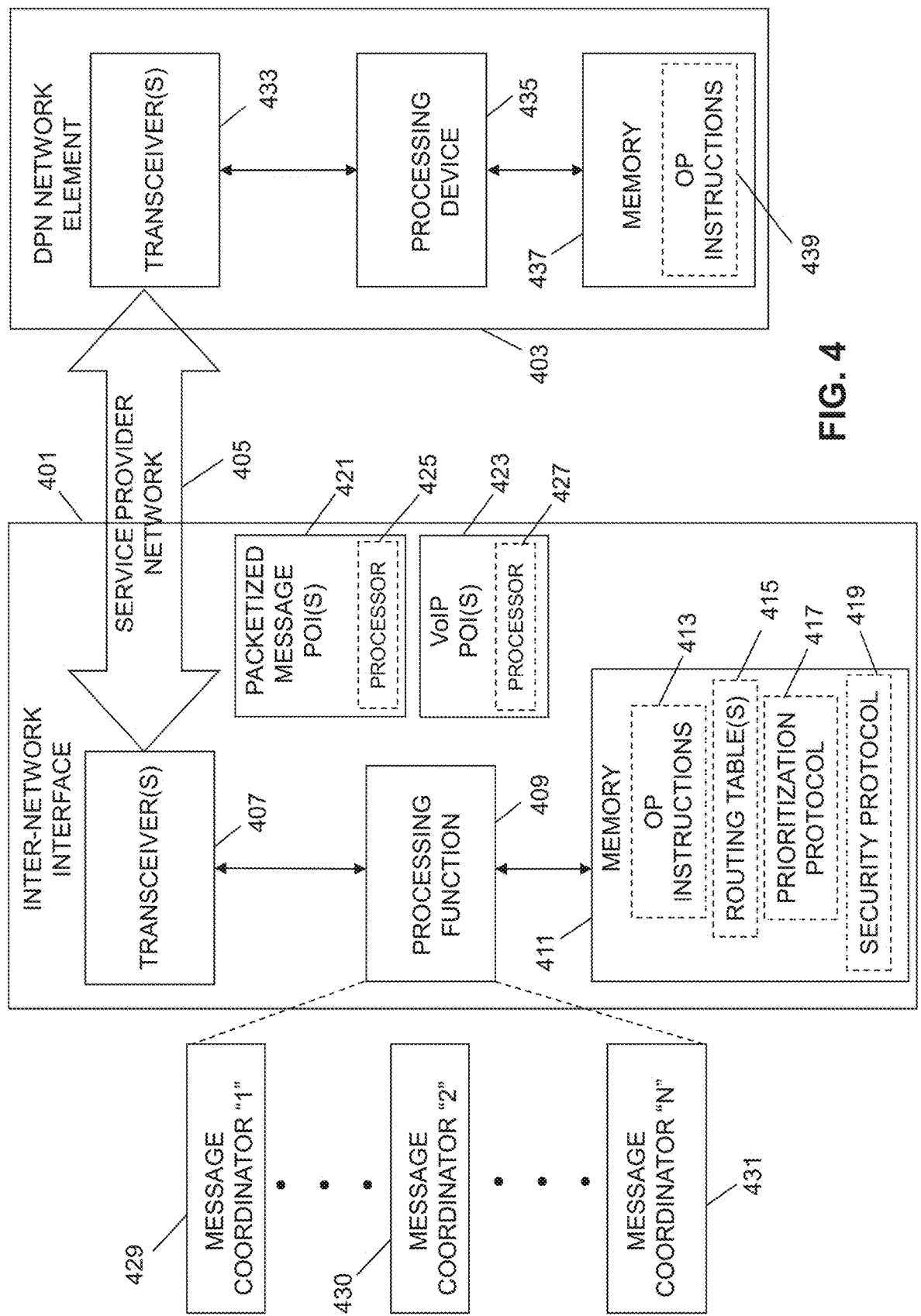
FIG. 4 is an electrical block diagram illustrating essential and optional components of an inter-network interface and a distributed private network (DPN) network element, in accordance with a further exemplary embodiment of the present disclosure.

FIG. 4 is an electrical block diagram illustrating essential and optional components of an inter-network interface 401 and a DPN network element 403, in accordance with a further exemplary embodiment of the present disclosure. The inter-network interface 401 and the DPN network element 403 exchange packetized messages over a public communication network 405 operated by a communication service provider. The inter-network interface 401 includes, among other things, one or more transceivers 407, a processing function 409, and memory 411. The memory 411 may store executable operating instructions 413 (e.g., an operating system and other computer programs specially configured to perform processes and functions used by the inter-network interface 401), routing tables 415 for each distributed private network supported by the inter-network interface, one or more prioritization protocols 417 for the supported distributed private networks, and/or one or more security protocols 419 for the supported distributed private networks. The inter-network interface 401 may optionally include one or more packetized message points of interface (POIs) 421 and, where the inter-network interface 401 supports VoIP services, one or more VoIP POIs 423. In one embodiment, the one or more packetized message point of interface includes a plurality of packetized message points of interface located within two or more service areas of the plurality of public communication networks. In one embodiment, the one or more packetized message POIs and the VoIP POIs are integrated into a single point of interface. Each packetized message POI and each VoIP POI, or each set of packetized message POIs and VoIP POIs, may include their own respective processors 425, 427 or other processing devices or functions. Alternatively, the functions of the POI and/or VoIP POI processors 425, 427 may be incorporated in the overall processor function 409 of the inter-network interface 401. The VoIP POI 423 and its associated processor 427 may function to determine do determine at least one of quantity, sizes, and durations of VoIP messages that pass through the VoIP point of interface during a predefined billing period and which originated from the public communication network operated by the first communication service provider; and report one or more of the determined quantity, sizes, and durations of VoIP messages to a billing system of the first communication service provider to facilitate a periodic determination of an amount of funds to be paid by the first communication service provider to a rural telephony service assistance fund under applicable communications regulations.

Additionally, where message coordinator functionality is incorporated into the inter-network interface 401, the processing function 409 of the inter-network interface 401 may include message coordinator functions for one or more DPN message coordinators 429, 430, 431 (three message coordinators 429, 430, 431 being shown for illustration purposes). When the processing function 409 performs a message coordinator function, the message coordinator function may be stored as computer program instructions 413 in the memory 411.

The DPN network element 403 may include, among other things, one or more transceivers 433, a processing function or device 435, and memory 437. The memory 437 preferably stores executable operating instructions 439 (e.g., an operating system and other computer programs) specially configured to perform processes and functions used by the DPN network element 403 in the distributed private network of which it is a part.

Figure 5:
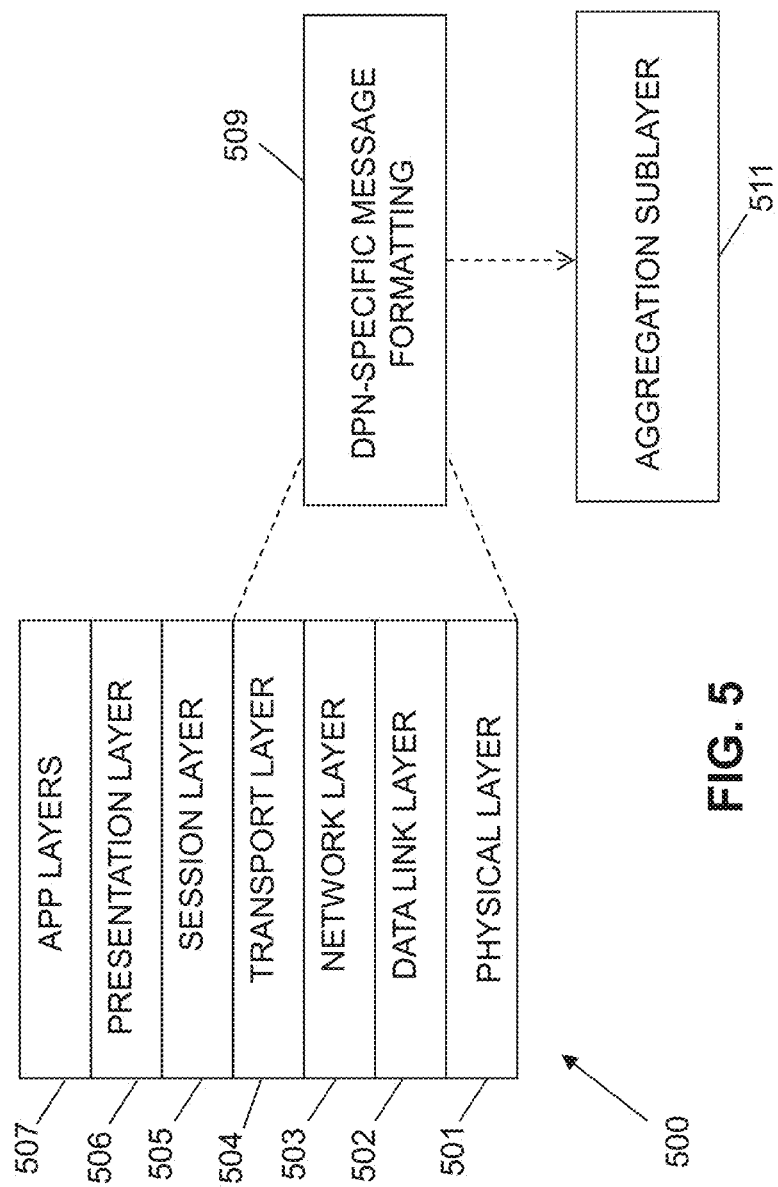
FIG. 5 illustrates positioning within the Open System Interconnection (OSI) protocol stack of a messaging format from which an inter-network interface or a message coordinator may determine whether a received packetized message is a message communicated within a distributed private network, in accordance with yet another exemplary embodiment of the present disclosure.

With reference to the OSI protocol stack 500 conventionally used for Internet communications, which stack 500 is illustrated generally in FIG. 5, the transceivers 407, 433 of the inter-network interface 401 and the DPN network element 403 preferably process the physical and data link layers and sublayers 501, 502 of packetized messages communicated between the inter-network interface 401 and the DPN network element 403. The packetized messages are preferably, although not exclusively, communicated using packetized messaging protocols, such as the Internet Protocol suite of message protocols.

Upon receiving a packetized message from the public communication network 405, the inter-network interface 401 determines whether the message was communicated by a DPN network element 403. According to one exemplary embodiment, the processing function 409 of the inter-network interface 401 may make such a determination by analyzing the lower protocol layers of the received message. Referring to FIG. 5, the processing function 409 may process and evaluate one or more of the physical, data link, network, and transport layers 501-504 of the received message to determine whether a messaging format 509 specific to a distributed private network has been used, where the packetized messages are constructed in accordance with the OSI protocol stack 500. In one particular embodiment, the DPN-specific messaging format, when used, may be included in an aggregation sublayer 511 of the transport layer 504 (layer 4), as discussed in more detail below with respect to FIG. 6. When the DPN-specific messaging format is included in the lowest layers of the protocol stack 500 (e.g., the physical layer 501 or the data link layer 502), the processing function 409 may control the transceiver 407, as necessary, to examine the details of those layers 501, 502 to perform the formatting analysis. By including the DPN-specific messaging format in the lower layers of the protocol stack 500, the inter-network interface need not expend processing resources to examine the higher protocol layers, such as the session layer 505, presentation layer 506, or applications layers 507, which generally have more extensive processing requirements.

Figure 6:
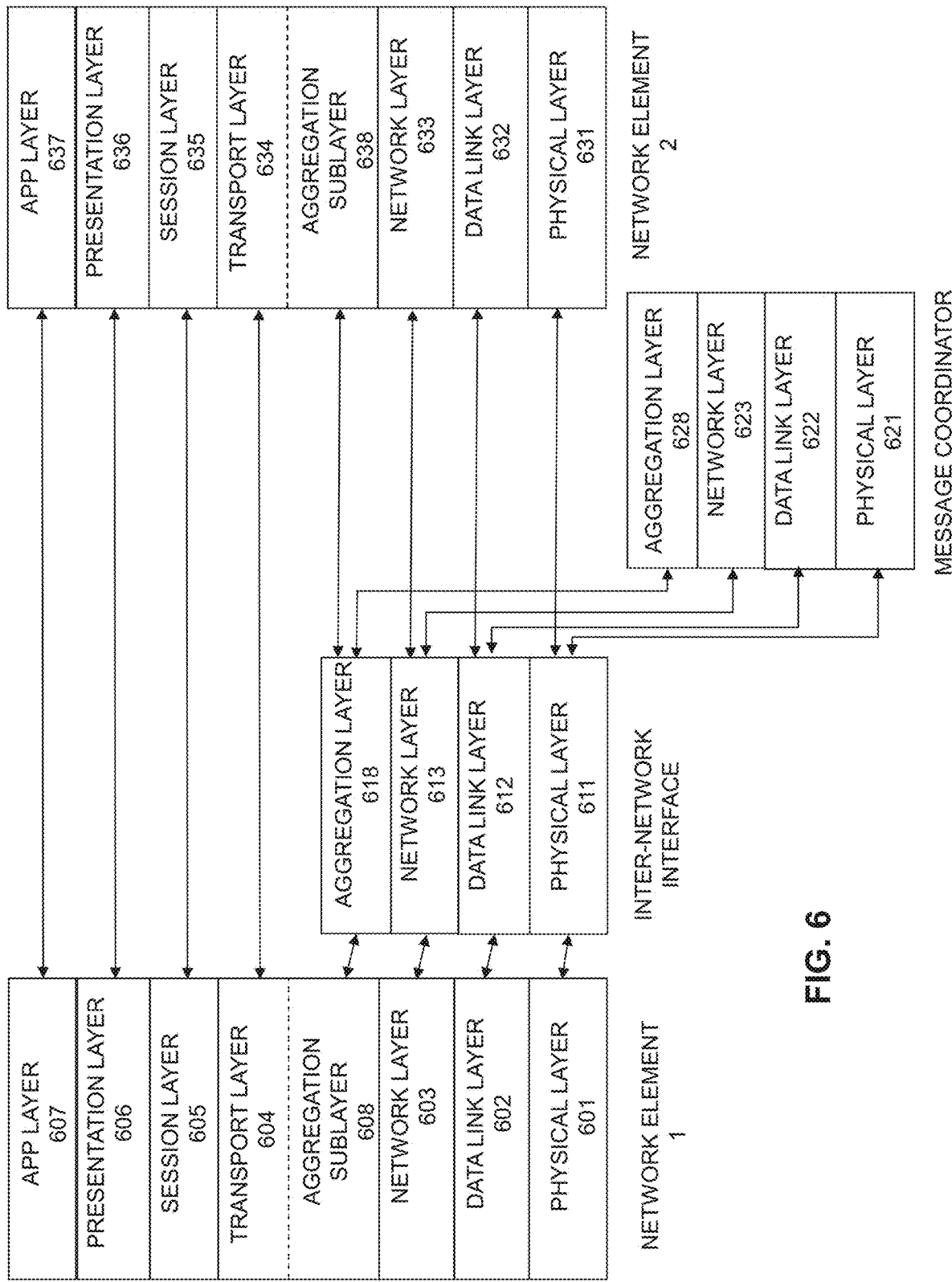
FIG. 6 is a flow diagram representing data flow between layers of exemplary OSI protocol stacks executing within elements of a system for communicating messages of one or more distributed private networks over multiple public communication networks, in accordance with a further exemplary embodiment of the present disclosure.

As an example of message data flow that may occur between layers of protocol stacks executing within elements of a system for communicating packetized messages of a distributed private network over multiple public communication networks, reference is made to the exemplary flows shown in FIG. 6. As illustrated in the figure, a first DPN network element (Network Element 1) utilizes a complete OSI protocol stack that includes physical, data link, network, transport, session, presentation, and application layers 601-607. The transport layer 604 of the first DPN network element includes an optional aggregation sublayer 608 that contains a messaging format to indicate that a packetized message originated by the first DPN network element is a message communicated in the distributed private network that includes the first DPN network element. As discussed above, the DPN-specific messaging format may be included one or more other lower layers of the protocol stack, or may be excluded altogether when the inter-network interface 401 is configured to determine, using an alternative process (e.g., a lookup table of DPN network element addresses and associated distributed private networks) that a received packetized message has been communicated in a distributed private network.

Similar to the first DPN network element, a second DPN network element of the distributed private network (Network Element 2) utilizes a complete OSI protocol stack that includes physical, data link, network, transport, session, presentation, and application layers 631-637. The transport layer 634 of the second network element may also include an optional aggregation sublayer 638 to process the messaging format contained in the aggregation sublayer 608 of the message sent by the first DPN network element and to contain a DPN-identifying messaging format for packetized messages generated by the second DPN network element. Thus, the protocol stack in each DPN network element of a particular distributed private network is substantially the same.

In contrast to the protocol stacks of the DPN network elements, the protocol stack of the inter-network interface 401 used for purposes of processing received packetized messages need not include all of the protocol layers because, for such purposes, the inter-network interface 401 only needs to process the lower protocol layers in order to confirm that a received message is being communicated in a distributed private network and to route the message to the appropriate message coordinator. As a result, the protocol stack of the inter-network interface may only need to include the physical layer 611, the data link layer 612, the network layer 613, and the transport layer (or just the aggregation sublayer 618, when the DPN-specific messaging format 509 is included therein). For purposes of processing packetized messages received from the inter-network interface 401, the message coordinator for the distributed private network (e.g., message coordinator 429) may also only need the lower layers of the protocol stack (e.g., the physical layer 621, the data link layer 622, the network layer 623, and the transport layer (or just the aggregation sublayer 628, when the DPN-specific messaging format 509 is included therein)), depending on how far up the stack the information is contained to enable the message coordinator 429 to perform its prioritization, routing, and/or security functions with respect to the received message. As those of ordinary skill in the art will readily recognize and appreciate, if the message coordinator 429 is also configured to generate or further process messages in the distributed private network it supports, the message coordinator 429 may need to include the entire protocol stack for the particular distributed private network. However, for purposes of analyzing a packetized message originated by a DPN network element, less processing is necessary in the inter-network interface 401, and may be necessary in the message coordinator 429, for purposes of directing the message to the appropriate public network for delivery to the message's intended target.

As illustrated in FIG. 6, when the first DPN network element sends a packetized message over a public communication network, the transceiver 407 of the inter-network interface 401 receives and processes the physical and data link layers 601, 602 of the message and forwards the message to the processing function 409 for further processing. The processing function 409, in accordance with the stored operating instructions 413, processes the network layer 603 and aggregation sublayer 608 of the message to determine whether the message is being communicated in a distributed private network. For example, the processing function 409 may determine whether the aggregation sublayer 608 includes a messaging format indicative of a particular distributed private network. When the processing function 409 detects a DPN-specific messaging format 509 in the aggregation sublayer 608 or another lower layer of the message's protocol stack, the processing function 409 communicates the message to the message coordinator 429 for the particular distributed private network. The message coordinator 429 may be separate from the inter-network interface 401 or may be a function within the inter-network interface 401. Where the message coordinator 429 is a process or function within the inter-network interface 401, the communication of the message to the message coordinator 429 may be merely a logical communication between the operating instruction modules 413 (program code) implementing the inter-network interface and message coordinator functions.

Upon receiving the packetized message from the inter-network interface's processing function 409, the message coordinator 429 processes appropriate layers of the message's protocol stack in order to determine a transport route for the message and an optional priority to be assigned to the message, as well as to optionally confirm that the message complies with the security protocol for the distributed private network. Where the message coordinator 429 is integrated in the inter-network interface 401, the processing function 409 of the inter-network interface 401 may implement the message coordinator function and retrieve the appropriate prioritization protocol 417 and security protocol 419 from memory 411 upon determining which distributed private network is involved. After analyzing the message, the message coordinator 429 may assign a priority and a transport route for the message. Assignment of the transport route may be a fixed assignment as stored in the routing tables 415, or such an assignment may be based on at least one of (a) a state of the distributed private network at a time when the packetized message was received at the inter-network interface 401 and (b) at least one of a function and a participation of the target network element within the distributed private network. For example, the transport routes stored in the routing tables 415 may be updated from time to time to reflect the current status of the distributed private network and/or the functions and/or participations of the DPN network elements. The message coordinator 429 may then select the transport route for the received message from the most recently updated routes in the routing tables 415. Alternatively, the message coordinator 429 may determine a transport route in real time by executing a routing algorithm that takes into account various parameters, including the state of the distributed private network at a time when the packetized message was received at the inter-network interface 401 and a function and/or participation of the target network element within the distributed private network.

In addition to assigning a transport route, the message coordinator 429 may optionally assign a priority to the message based on the prioritization protocol 417 for the distributed private network. The prioritization protocol may include several levels of priority based on various parameters, such as the function and/or participation of the sending and/or target DPN network elements, the type of message, the current state of the distributed private network, the time of day, environmental conditions, a class of service supported by the public communication network providing communication service to the target DPN network element, and so forth. The class of service comprises a class of Internet service.

The message coordinator 429 may further optionally generate a new secure packetized message directed to the target network element if the received message does not comply with the security protocol 419 for the distributed private network. The new message would include the contents of the received message and comply with the security protocol 419 for the distributed private network (e.g., include appropriate encryption and other security measures to comply with the security protocol of the distributed private network). Alternatively, if the received message includes the proper security protocol, the message coordinator may nevertheless generate a new message that includes the contents of the original message, as well as the assigned priority and transport route information. After assigning the transport route and optional priority, and either verifying security protocol compliance or creating a new security protocol-compliant message, the message coordinator 429 communicates the secure packetized message via the transceiver 407 to the public communication network 405 servicing the target DPN network element based upon the priority and the transport route.

In an alternative embodiment in which the inter-network interface 401 supports multiple independent and dedicated subnetworks, the processing function 409 may be further operable in accordance with the operating instructions 413 to assign each distributed private network to its own subnetwork. In such a case, messages received on a subnetwork may be readily identified as being communicated within the distributed private network assigned to the particular subnetwork.

Figure 7:
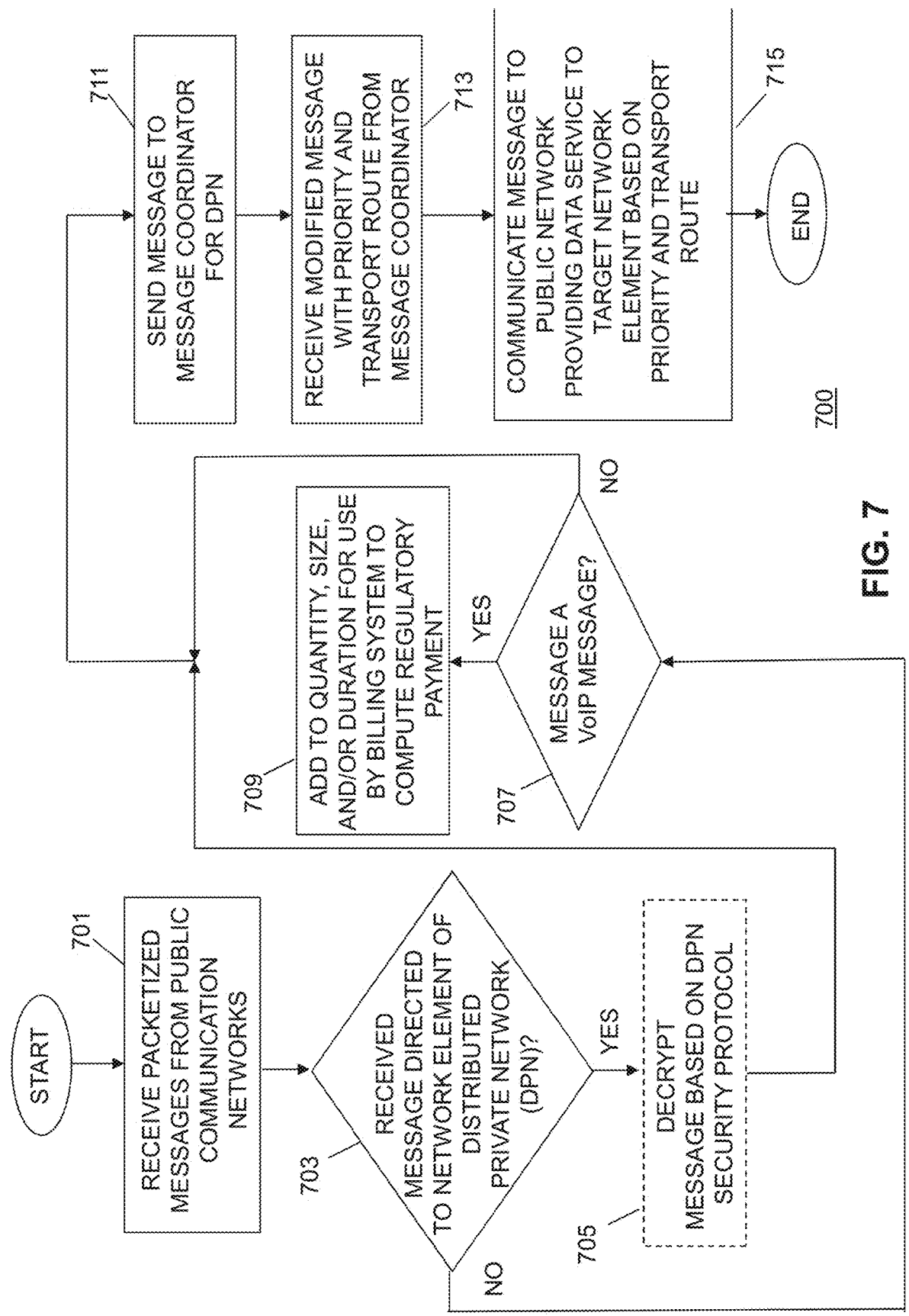
FIG. 7 is a logic flow diagram of steps executed by an inter-network interface to facilitate the communication of messages of one or more distributed private networks over multiple public communication networks, in accordance with another exemplary embodiment of the present disclosure.

FIG. 7 is a logic flow diagram 700 of steps executed by an inter-network interface 401 to facilitate the communication of messages of one or more distributed private networks over multiple public communication networks, in accordance with another exemplary embodiment of the present disclosure. According to the logic flow reflected in the diagram 700, the inter-network interface 401 receives (701) a packetized message from a public communication network 405. The inter-network interface 401 determines (703) whether the received message is directed to a network element of a distributed private network. Such a determination may be based on analyzing the lower protocol layers of the message for a DPN-specific messaging format, comparing the destination address of the message to a database correlating device addresses with distributed private networks, determining a subnetwork on which the message was received, and so forth. If the received message is directed to a network element of a distributed private network, the inter-network interface 401 may optionally decrypt (705) the message based on the security protocol for the distributed private network, although such an action may require an undesirable amount of processing resources depending on how far up the protocol stack the security protocol encryption is contained.

If the received message is not directed to a network element of a distributed private network, the inter-network interface 401 determines (707) whether the message is a VoIP message. If the message is a VoIP message, the inter-network interface 401 adds (709) the message to a quantity, size and/or duration being monitored on behalf of the public communications network from which the message originated for purposes of periodically reporting VoIP call data to the public network's billing system to compute the network's regulatory payment into the USF fund or another rural telephony service assistance fund under applicable communications regulations.

If the received message is not a VoIP message and was directed to a DPN network element, the inter-network interface sends (711) the message to a message coordinator for the involved distributed private network. Thereafter, the inter-network interface may receive (713) a modified message from the message coordinator, which may include a priority and a transport route for the message. The inter-network interface communicates (715) the message received from the message coordinator to the public communication network providing data service to the target DPN network element based on the priority and transport route.

Figure 8:
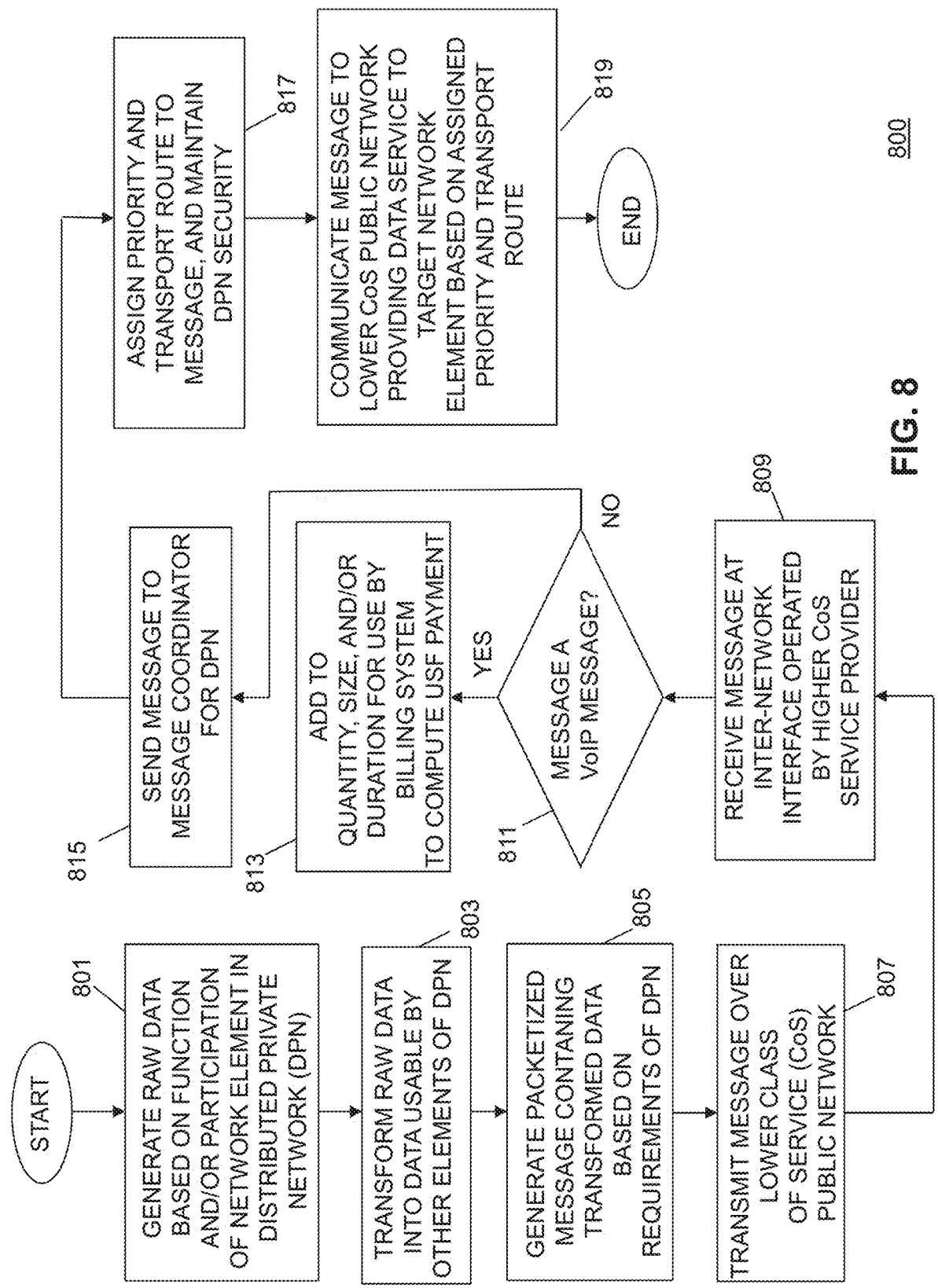
FIG. 8 illustrates a logic flow diagram of steps executed by elements of a system for communicating messages of one or more distributed private networks over multiple public communication networks, in accordance with a further exemplary embodiment of the present disclosure.

FIG. 8 illustrates a logic flow diagram 800 of steps executed by elements of a system for communicating messages of one or more distributed private networks over multiple public communication networks, in accordance with a further exemplary embodiment of the present disclosure. According to the logic flow of FIG. 8, a DPN network element generates (801) raw data based on a function and/or a participation of the DPN network element in the particular distributed private network. The DPN network element may then transform (803) the raw data into data usable by one or more other elements of the distributed private network. For example, where the DPN network element is a smart meter and accompanying processor programmed to produce revenue grade metrology data, the smart meter may measure the raw data relating to power consumed at a location and the processor may transform the raw data into revenue grade data through use of an appropriate algorithm.

The DPN network element generates (805) a packetized message containing the transformed data based on the requirements (including security requirements) of the distributed private network and transmits (807) the generated message over a lower class of service public communication network. According to this embodiment, the DPN network element is presumed to be located in a service area of a rural or lower class public network.

The transmitted message is received (809) at an inter-network interface operated by a higher class of service communication service provider. For example, the higher class of service provider, such as a commercial cable, wireline, or wireless carrier, may control the inter-network interface, which may include multiple inter-network interface (INI) elements distributed within service areas or boundaries of lower class of service carriers. In such a case, an INI element located in a service area of a lower class of service carrier providing communication service to the DPN network element may have received the original packetized message from the DPN network element.

Upon receiving the message at the inter-network interface, the inter-network interface determines (811) whether the message is a VoIP message. If the message is a VoIP message, the inter-network interface 401 adds (813) the message to a quantity, size and/or duration being monitored on behalf of the public communications network from which the message was received for purposes of periodically reporting VoIP call data to the public network's billing system. Based on the periodic reporting, the public network's billing system may compute the network's regulatory payment into the USF fund or another rural telephony service assistance fund under applicable communications regulations.

If the received message is not a VoIP message and was directed to a DPN network element, the inter-network interface sends (815) the message to a message coordinator for the involved distributed private network. The message coordinator then assigns (817) a transport route and optional priority to the message, and maintains the security requirements for the distributed private network. As discussed above, maintaining such security requirements and/or assigning the transport route and/or priority may involve generating a new message containing the transport route and priority, and encrypting the new message to comply with the security protocol of the distributed private network. After the transport route and optional priority have been assigned, the message coordinator communicates (819) the original, modified original, or new message, via the inter-network interface, to a lower class of service public communication network providing packetized data service to the target DPN network element based on the assigned priority and/or transport route. The public communication network providing packetized data service to the target DPN network element may be the same network providing packetized data service to the sending DPN network element or another public communication network (e.g., as serviced by another rural or lower class of service carrier).

Certain modifications and improvements will occur to those skilled in the art upon a reading of the foregoing description. By way of example and not limitation, the present invention systems and methods are applicable to electric power grid communications, and to communications for any critical infrastructure, for public safety, for oil and gas networks, etc. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A system for communicating messages of a distributed private network (DPN) over a plurality of communication networks for critical infrastructure, the system comprising:
   an inter-network interface and at least one coordinator, wherein the inter-network interface is part of a cloud service provider and is in network communication with the at least one coordinator;
   wherein the inter-network interface comprises at least one network interface, a processing function, and a memory;
   wherein the at least one coordinator comprises at least one additional network interface, at least one processing device, and at least one memory;
   wherein the inter-network interface is part of a first service area;
   wherein the inter-network interface is operable to receive a message from a first DPN network element of the first service area over a first communication network;
   wherein the inter-network interface is operable to communicate the message to the at least one coordinator;
   wherein the at least one coordinator is operable to:
   receive the message from the inter-network interface;
   assign a transport route to the message;
   assign a priority and a security protocol to the message based on a prioritization protocol for the DPN; and return the message to the inter-network interface;
wherein the inter-network interface is operable to determine whether the assigned transport route is available; and
wherein the inter-network interface is operable to communicate the message to a second DPN network element over a second communication network based on the assigned transport route or an alternative transport route when the assigned transport route is unavailable.

2. The system of claim 1, wherein at least one of the first DPN network element and the second DPN network element is a smart meter.

3. The system of claim 1, wherein the inter-network interface is in network communication with at least two coordinators.

4. The system of claim 1, wherein the inter-network interface is operable to process the message from lowest to highest Open Systems Interconnection (OSI) layer.

5. The system of claim 4, wherein the inter-network interface is operable to process the message using only physical, data link, network, and transport OSI layers with aggregation sublayer.

6. The system of claim 1, wherein the first service area is owned by a first electric utility, and wherein the second service area is owned by a second electric utility.

7. The system of claim 1, wherein the inter-network interface modifies the message before communicating it to the at least one coordinator.

8. The system of claim 1, wherein the inter-network interface further comprises at least one Voice over Internet Protocol (VoIP) point of interface for supporting VoIP services.

9. The system of claim 8, wherein the at least one VoIP point of interface is operable to determine whether the message is a VoIP message and add the determined VoIP message to a quantity, size, and/or duration for periodically reporting VoIP call data to a billing system of the first communication network.

10. A method for communicating messages of a distributed private network (DPN) over a plurality of public communication networks, comprising:
providing an inter-network interface and at least one coordinator, wherein the inter-network interface is part of a cloud service provider and is in network communication with the at least one coordinator;
the inter-network interface receiving a message from a first DPN network element over a first public communication network;
the inter-network interface communicating the message to the at least one coordinator;
the at least one coordinator receiving the message from the inter-network interface;
the at least one coordinator assigning a transport route to the message;
the at least one coordinator further assigning a priority and a security protocol to the message based on a prioritization protocol for the DPN;
the at least one coordinator returning the message to the inter-network interface; and
the inter-network interface communicating the message to a second DPN network element based on the assigned transport route over a second public communication network.

11. The method of claim 10, further comprising the first DPN network element generating raw data based on a participation in the DPN and transforming the raw data into revenue grade data.

12. The method of claim 11, further comprising the inter-network interface receiving the revenue grade data in the message from first DPN network element.

13. The method of claim 10, wherein at least one of the first DPN network element and the second DPN network element is a smart meter.

14. The method of claim 10, further comprising the inter-network interface processing the message from lowest to highest Open Systems Interconnection (OSI) layer.

15. The method of claim 10, further comprising the inter-network interface processing the message using only physical, data link, network, and transport OSI layers with aggregation sublayer.

16. The method of claim 10, further comprising the inter-network interface determining whether the message is a Voice over IP (VoIP) message and adding the VoIP message to a quantity, size, and/or duration for periodically reporting VoIP call data to a billing system of the first public communication network.

17. The method of claim 16, further comprising the inter-network interface communicating the message to the at least one coordinator if the message is determined not to be the VoIP message.

18. A system for communicating messages of a distributed private network (DPN) over a plurality of communication networks for critical infrastructure, the system comprising:
an inter-network interface and at least one coordinator, wherein the inter-network interface is in network communication with the at least one coordinator;
wherein the inter-network interface comprises at least one network interface, a processing function, and a memory;
wherein the at least one coordinator comprises at least one additional network interface, at least one processing device, and at least one memory;
wherein the inter-network interface is part of a first public communication network;
wherein the inter-network interface is operable to receive a message from a first DPN network element of the first public communication network;
wherein the inter-network interface is operable to communicate the message to the at least one coordinator;
wherein the at least one coordinator is operable to:
receive the message from the inter-network interface;
assign a transport route to the message;
assign a priority and a security protocol to the message based on a prioritization protocol for the DPN; and
return the message to the inter-network interface; and
wherein the inter-network interface is operable to communicate the message to a second DPN network element over a second public communication network.

19. The system of claim 18, wherein the inter-network interface modifies the message before communicating it to the at least one coordinator.

20. The system of claim 18, wherein the inter-network interface further comprises at least one Voice over Internet Protocol (VoIP) point of interface for supporting VoIP services and wherein the at least one VoIP point of interface is operable to determine whether the message is a VoIP message and add the determined VoIP message to a quantity, size, and/or duration for periodically reporting VoIP call data to a billing system of the first communication network.

* * * * *